US007844384B2

(12) United States Patent
Seto

(10) Patent No.: US 7,844,384 B2
(45) Date of Patent: Nov. 30, 2010

(54) VEHICULAR TRAVELING CONTROL APPARATUS AND METHOD

(75) Inventor: Yoji Seto, Kanagawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 1665 days.

(21) Appl. No.: 10/825,116

(22) Filed: Apr. 16, 2004

(65) Prior Publication Data

US 2004/0236491 A1 Nov. 25, 2004

(30) Foreign Application Priority Data

May 22, 2003 (JP) ............................. 2003-145202

(51) Int. Cl.
*G05D 3/00* (2006.01)
*G06F 7/70* (2006.01)
*G01C 21/30* (2006.01)

(52) U.S. Cl. ............................. 701/96; 701/49; 701/70; 701/210; 362/466

(58) Field of Classification Search ................... 701/96, 701/97, 300, 301, 210, 70, 49; 340/435, 340/436; 180/274, 277; 356/4.01; 342/70, 342/71; 362/466
See application file for complete search history.

(56) References Cited

U.S. PATENT DOCUMENTS

| 6,067,488 | A | | 5/2000 | Tano |
| 6,122,040 | A | | 9/2000 | Arita et al. |
| 6,269,298 | B1 | * | 7/2001 | Seto ............................. 701/96 |
| 6,470,257 | B1 | * | 10/2002 | Seto ............................. 701/96 |
| 6,640,181 | B2 | * | 10/2003 | Akabori et al. ............... 701/96 |
| 6,650,990 | B2 | * | 11/2003 | Yamamura et al. ............ 701/96 |
| 6,687,595 | B2 | * | 2/2004 | Seto et al. ..................... 701/96 |
| 6,769,504 | B2 | * | 8/2004 | Kobayashi et al. .......... 180/169 |
| 6,856,887 | B2 | * | 2/2005 | Akabori et al. ............... 701/96 |
| 7,015,805 | B2 | * | 3/2006 | Knoop et al. ................ 340/467 |
| 7,016,783 | B2 | * | 3/2006 | Hac et al. .................... 701/301 |
| 7,099,764 | B2 | * | 8/2006 | Seto et al. ...................... 701/70 |
| 2001/0016798 | A1 | * | 8/2001 | Kodaka et al. ............... 701/301 |
| 2002/0091479 | A1 | * | 7/2002 | Maruko et al. ................. 701/96 |
| 2002/0099491 | A1 | * | 7/2002 | Akabori et al. ................ 701/96 |
| 2002/0111733 | A1 | * | 8/2002 | Akabori et al. ................ 701/96 |
| 2002/0134602 | A1 | * | 9/2002 | Kobayashi et al. .......... 180/169 |
| 2002/0169538 | A1 | * | 11/2002 | Yamamura et al. ............ 701/96 |
| 2003/0028311 | A1 | * | 2/2003 | Seto et al. ...................... 701/96 |

(Continued)

FOREIGN PATENT DOCUMENTS

JP 4-081330 A 3/1992

(Continued)

*Primary Examiner*—Khoi Tran
*Assistant Examiner*—Ian Jen
(74) *Attorney, Agent, or Firm*—Foley & Lardner LLP

(57) ABSTRACT

In vehicular traveling control apparatus and method, comprising: a vehicular forward substance detecting section of a laser radar type is provided to detect a forward substance located in a forward direction of the vehicle, a vehicular travel control is performed on the basis of a relative positional relationship between the forward substance detected by the vehicular forward substance detecting section and the vehicle, such an impulse that a detection range of the vehicular forward substance detecting section is varied has been applied to the vehicular forward detecting section is detected, and the vehicular traveling control is inhibited when detecting that the impulse has been applied to the vehicular forward substance detecting section.

25 Claims, 14 Drawing Sheets

U.S. PATENT DOCUMENTS

| | | | |
|---|---|---|---|
| 2003/0067219 A1* | 4/2003 | Seto et al. | 303/193 |
| 2003/0201878 A1* | 10/2003 | Bai et al. | 340/435 |
| 2003/0208312 A1* | 11/2003 | Winter et al. | 701/96 |
| 2004/0145238 A1* | 7/2004 | Seto et al. | 303/193 |
| 2004/0193351 A1* | 9/2004 | Takahashi et al. | 701/70 |
| 2004/0193374 A1* | 9/2004 | Hac et al. | 701/301 |
| 2004/0236491 A1* | 11/2004 | Seto | 701/96 |
| 2005/0125153 A1* | 6/2005 | Matsumoto et al. | 701/300 |
| 2005/0222746 A1* | 10/2005 | Shevela | 701/93 |
| 2005/0269149 A1* | 12/2005 | Harumoto et al. | 180/274 |
| 2007/0032914 A1* | 2/2007 | Kondoh et al. | 701/1 |
| 2007/0129891 A1* | 6/2007 | Yano et al. | 701/301 |
| 2007/0192030 A1* | 8/2007 | Tanimichi et al. | 701/301 |
| 2007/0208485 A1* | 9/2007 | Yamamura et al. | 701/93 |
| 2008/0033621 A1* | 2/2008 | Nakamura et al. | 701/65 |
| 2008/0078600 A1* | 4/2008 | Inoue et al. | 180/170 |
| 2008/0270001 A1* | 10/2008 | Seto et al. | 701/93 |
| 2008/0312834 A1* | 12/2008 | Noda et al. | 701/301 |

FOREIGN PATENT DOCUMENTS

| | | |
|---|---|---|
| JP | 9-011870 A | 1/1997 |
| JP | 10-063905 A | 3/1998 |
| JP | 10-132939 A | 5/1998 |
| JP | 11-142520 A | 5/1999 |
| JP | 2000-142321 A | 5/2000 |
| JP | 2001-138880 A | 5/2001 |
| JP | 2002-036908 A | 2/2002 |

* cited by examiner

VEHICULAR TRAVELING CONTROL APPARATUS AND METHOD

BACKGROUND OF THE INVENTION

1. Field of the Invention

The present invention relates to vehicular traveling control apparatus and method which perform a vehicular traveling control in accordance with a relative positional relationship between an obstacle (a substance or a target) located in front of the vehicle (a vehicular forward direction) and the vehicle (also called a host vehicle).

2. Description of the Related Art

A Japanese Patent Application First Publication No. Heisei 10-132939 published on May 22, 1998 exemplifies a previously proposed vehicular forward substance recognition apparatus in which, in a case where a stopped. (or stationary) object (or substance and, so-called, a delineator located at a vehicular forward road side) detected by means of a sensor for recognizing a vehicular forward obstacle (substance) located in front of the host vehicle, a trajectory of the substance (or object or obstacle) is statistically processed to detect an optical axis deviation quantity (a deviation quantity from a vehicular longitudinal axial line) and corrects a relative positional information to the forward obstacle on the basis of the optical axis deviation quantity.

SUMMARY OF THE INVENTION

However, in the previously proposed vehicular forward substance recognition apparatus, the optical axis deviation is detected by processing statistically a movement trajectory of the stopped object (substance). Hence, the optical axis deviation cannot accurately be detected since a considerable time duration has passed from a time at which an actual optical axis deviation has occurred. In a case where the optical axis deviation is detected due to a light collision, a system is unavoidably operated with the optical axis deviated until the optical axis deviation is detected.

It is, therefore, an object of the present invention to provide vehicular traveling control apparatus and method which are capable of detecting immediately when a deviation (or variation) in a detection range of a sensor to recognize the forward obstacle located in front of the vehicle has occurred.

The above-described object can be achieved by providing a vehicular traveling control apparatus, comprising: a vehicular forward substance detecting section that detects a forward substance located in a forward direction of the vehicle: a vehicular travel controlling section that performs a vehicular travel control on the basis of a relative positional relationship between the forward substance detected by the vehicular forward substance detecting section and the vehicle; an impulse detecting section that detects such an impulse that a detection range of the vehicular forward substance detecting section is varied has been applied to the vehicular forward detecting section; and a traveling control inhibiting section that inhibits the vehicular traveling control by means of the vehicular travel controlling section when the impulse detecting section detects that the impulse has been applied to the vehicular forward substance detecting section.

The above-described object can also be achieved by providing a vehicular traveling control method, comprising: providing a vehicular forward substance detecting section that detects a forward substance located in a forward direction of the vehicle: performing a vehicular travel control on the basis of a relative positional relationship between the forward substance detected by the vehicular forward substance detecting section and the vehicle; detecting such an impulse that a detection range of the vehicular forward substance detecting section is varied has been applied to the vehicular forward detecting section; and inhibiting the vehicular traveling control when detecting that the impulse has been applied to the vehicular forward substance detecting section.

This summary of the invention does not necessarily describe all necessary features so that the invention may also be a sub-combination of these described features.

DETAILED DESCRIPTION OF THE PREFERRED EMBODIMENTS

Reference will hereinafter be made to the drawings in order to facilitate a better understanding of the present invention.

First Embodiment

Figure 1:
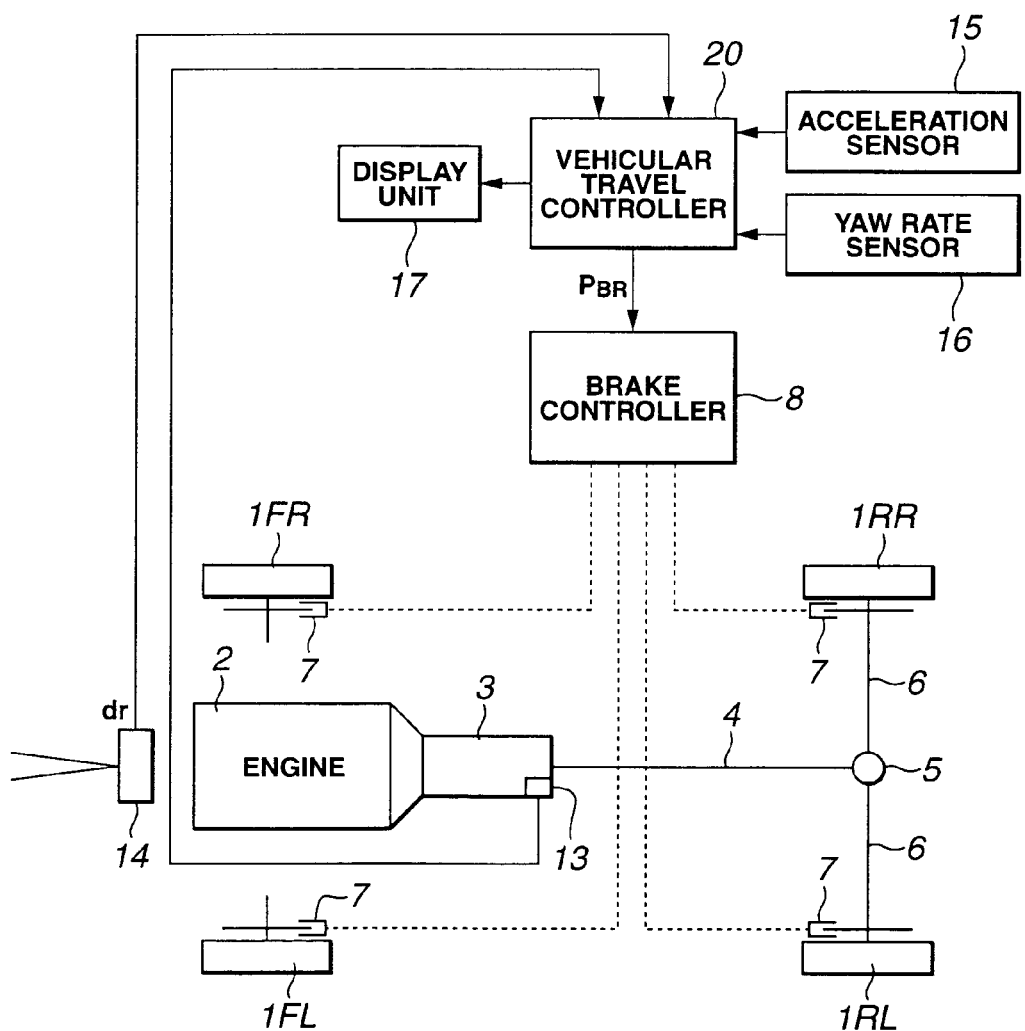
FIG. 1 is a rough system configuration view of a vehicular traveling control apparatus applicable to a front-engine-rear-drive vehicle in a first preferred embodiment according to the present invention.

FIG. 1 shows a rough configuration view of a vehicular traveling control apparatus in a first preferred embodiment according to the present invention. In FIG. 1, a vehicle (or, so-called, a host vehicle) to which the vehicular traveling control apparatus in the first embodiment is applicable is a front-engine-rear-drive car (FR car). In FIG. 1, 1FL and 1FR denote front left and right road wheels as non-driven wheels in the case of FR car and 1RL and 1RR are rear left and right road wheels as non-driven wheels in the case of FR car. A driving force developed from an engine 2 drives revolutionally rear road wheels FL and FR via an automatic transmission 3, a propeller shaft 4, a final reduction gear (differential) unit 5, and vehicular axle 6.

A brake actuator 7, for example, constituted by a disc brake to develop a braking force is installed on each of front left and right and rear left and right road wheels FL, FR, RL, and RR. A braking hydraulic of these brake actuators 7 are controlled by means of a brake controller 8.

It is noted that, brake controller 8 develops a braking hydraulic in accordance with a depression depth of a brake pedal with a driver (not shown). In addition, a braking hydraulic is developed in accordance with a braking pressure command value $P_{BR}$ from a travel controller (or called vehicular running speed controller) 20. The braking hydraulic is outputted to brake actuator 7. Furthermore, a vehicle speed sensor 13 is disposed by detecting a revolutional speed of an output axle disposed at an output side of automatic transmission 3 so as to detect a vehicular velocity (or vehicle speed) Vs (also called, a host vehicle speed).

Figure 2:
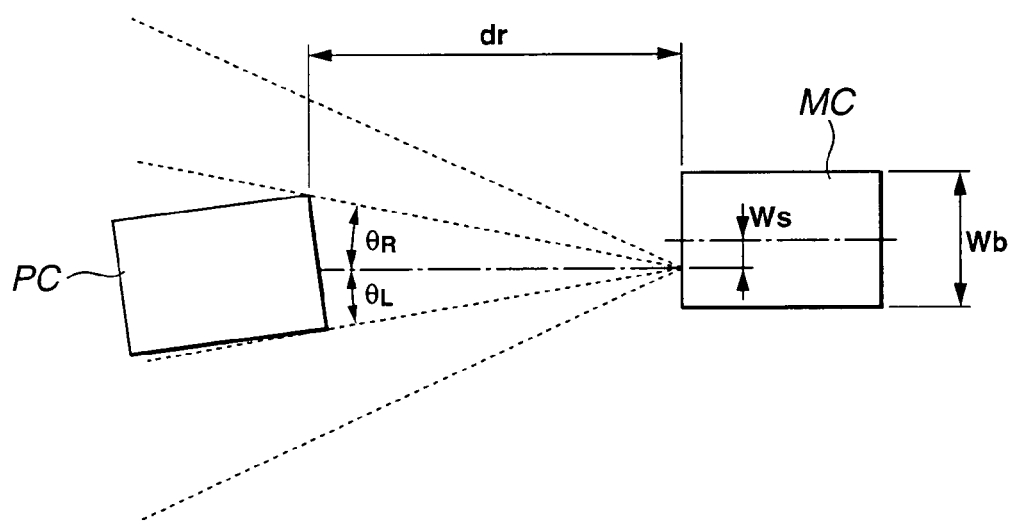
FIG. 2 is an explanatory view of a vehicular forward substance sensor used in the first embodiment of the vehicular traveling control apparatus according to the present invention.

A forward substance sensor 14 is disposed as a forward substance detecting section (forward substance detecting means) on a lower portion of the vehicle located at a front end of the vehicle. A scanning type laser radar radiates a fine laser light beam toward a vehicular forward detection zone periodically within a predetermined radiation range (for example, by 12° through 24° in a horizontal direction, in a vertical direction by 4°) deviating in a horizontal direction of the vehicle for each constant angle and receives a reflected light beam returned by reflecting from the forward substance. On the basis of a time difference from a timing at which the laser beam light is radiated to a timing at which the reflected laser light beam is received, a relative distance dr between the host vehicle MC and forward substance PC for each angle, as shown in FIG. 2. A relative speed Vi between the forward substance and the host vehicle is calculated from a variation in time in a relative distance dr to the forward vehicle detected. On the basis of a scanning angle between the detection signal of forward substance sensor 14 and the scanning angle, with an advance direction of the host vehicle as a reference, Angular ranges $\theta_R$ and $\theta_L$ of left and right edges of the forward substance with respect to the advance direction of the host vehicle are detected.

This forward substance sensor 14 is usually attached with engagement tools with a high accuracy of an allowable error range (for example, ±0.5°) from a longitudinal optical axis error allowable range from the longitudinal axis line with its optical axis direction of the optical axial line. A some shock is applied onto the vehicle body causes the optical axis direction of the sensor is deviated in the vertical direction exceeding an allowance error range from the forward and rearward optical axial line direction, the substance located obliquely forward direction erroneously recognized as a substance just located at the forward direction of the host vehicle. If deviated in a vertical direction, the forward substance cannot be recognized. Hence, it is not possible to accurately detect a relative positional relationship to the forward substance.

Then, an acceleration sensor 15 to detect a longitudinal acceleration Xg developed on the vehicle and a yaw rate sensor 16 to detect a yaw rate φ developed on the host vehicle are disposed. Furthermore, a display unit 17 is installed to display an optical axis deviation within a passenger compartment. An optical axis deviation is detected for the forward substance sensor 14. Then, when an optical axis deviation command is received from travel controller 20, the display unit produces an optical axis deviation state to a viewer, viz., a driver.

Travel controller 20 receives vehicle velocity Vs outputted from vehicle speed sensor 13, relative distance dr, relative velocity Vr, angular ranges $\theta_R$ and $\theta_L$ outputted from forward obstacle sensor 14, an acceleration Xg outputted from acceleration sensor 15, and yaw rate φ outputted from yaw rate sensor 15. This travel controller 20 determines whether a shock (or impulse) varying a detection range is applied to forward substance sensor 14 on the basis of any one of vehicle speed sensor 13, vehicle forward substance sensor 14, acceleration sensor 15, and a yaw rate sensor 16 to estimate an optical axis deviation quantity Δθ. In addition, travel controller 20 allows a braking control for the host vehicle by outputting the braking pressure command value $P_{BR}$ when relative distance dr between forward substance detected by means of forward substance sensor 14 is equal to or lower than a braking control operation distance $d_{SET}$ set on the basis of optical axis deviation quantity Δθ.

Figure 3:
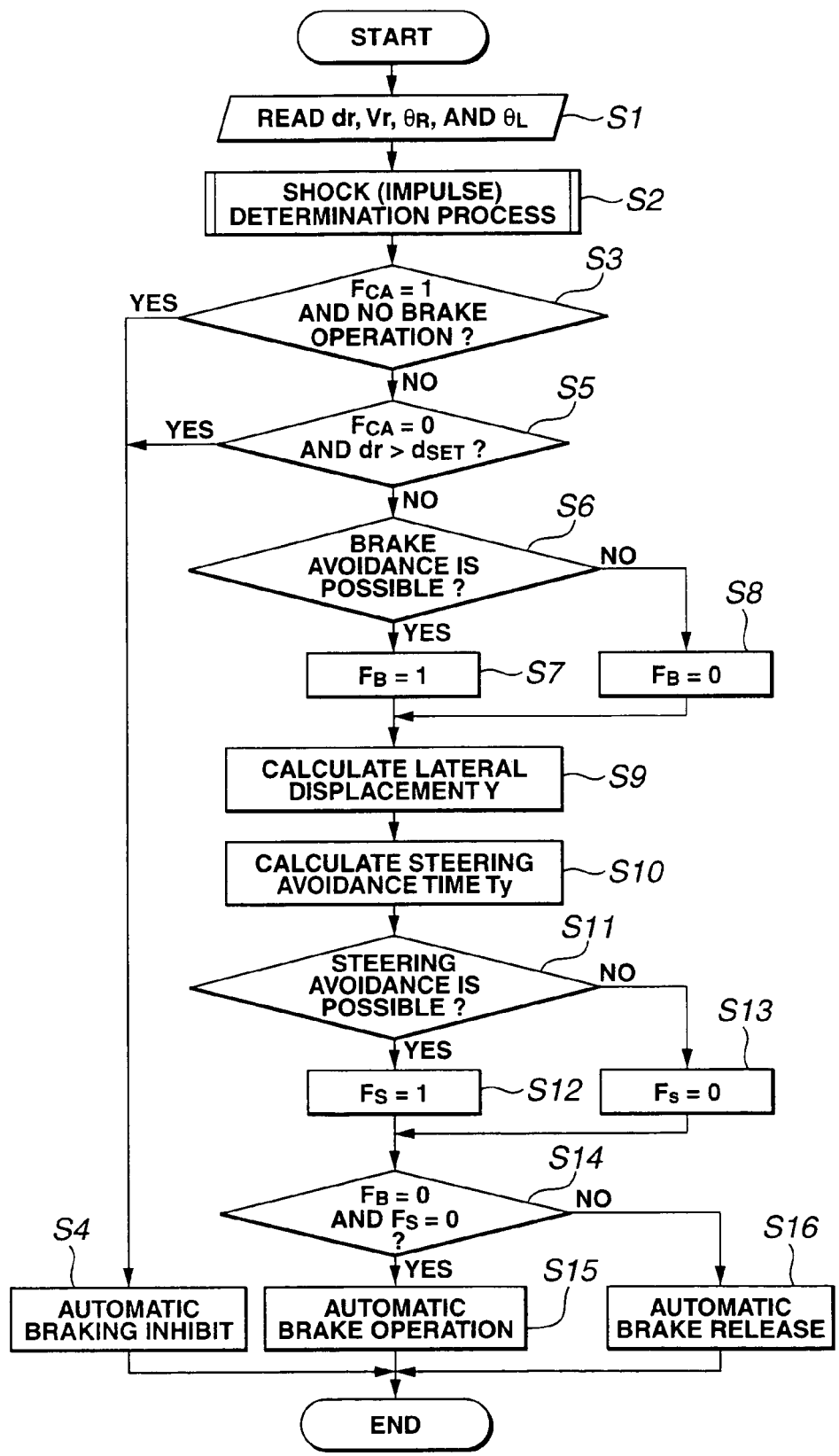
FIG. 3 is an operational flowchart representing a brake control operation determination procedure executed by a vehicular travel controller in the first embodiment according to the present invention.

Next, a braking control operation determination process executed by travel controller 20 will be described with reference to FIG. 3 as an operation of the first embodiment of travel controller 20. This braking control operation determination process executed by travel controller 20 is executed as a timer interrupt routine for each predetermined time (for example, 10 milliseconds).

At a step S1, travel controller 20 reads relative distance dr, relative velocity Vr, and angular range limit values $\theta_R$ and $\theta_L$. At a step S2, travel controller 20 detects a shock (or impulse) by which the detection range to forward substance sensor 14 changes as will be described later at the shock determination process and sets an inhibit determination and brake control operation distance $d_{SET}$. Then, the routine goes to a step S3. At step S3, travel controller 20 determines whether a brake operation inhibit flag $F_{CA}$ is set to "1" representing that the control is inhibited and an automatic braking is not being operated. If travel controller 20 determines that brake control inhibit flag $F_{CA}$ is set to "1" representing the control inhibit of brake control inhibit flag $F_{CA}$ set at step S2 and that the automatic control is not in operation, the routine goes from step S3 to a step S4 to inhibit the operation of the brake control. Then, the operation of the braking control is inhibited at step S4. Then, this timer interrupt routine is ended and the routine is returned to a predetermined main program.

If a result of determination at step S3 indicates that $F_{CA}=0$ or that the automatic brake is being operated, the routine goes to a step S5. At step S5, travel controller 20 determines whether relative distance dr to the forward substance is in excess of brake control operation distance $d_{SET}$ set at step S2. If $F_{CA}=0$ and dr>$d_{SET}$, travel controller 20 determines that the host vehicle is traveling within the brake control inhibit region and the routine goes to step S4. Otherwise, the routine goes to a step S6. At step S6, travel controller 20 determines whether a brake operation with the driver causes the collision with the vehicular forward substance is unavoidable or not.

At step S6, travel controller 20 determines whether such a relationship of relative distance dr and relative velocity Vr read at step S1 as an equation (1) is established or not. If equation (1) is not established, travel controller 20 determines that the collision avoidance due to the braking is possible and the routine goes to a step S7. At step S7, a braking collision avoidance flag $F_B$ is set to a logical "1". On the other hand, in a case where the following equation (1) is established, travel controller 20 determines that the collision avoidance due to the braking through a vehicular brake system is impossible and the routine goes to a step S8. At step S8, travel controller 20 resets brake collision avoidance flag $F_B$ to "0".

$$dr < -Vr \cdot Td + Vr^2/2s \qquad (1).$$

Figure 4:
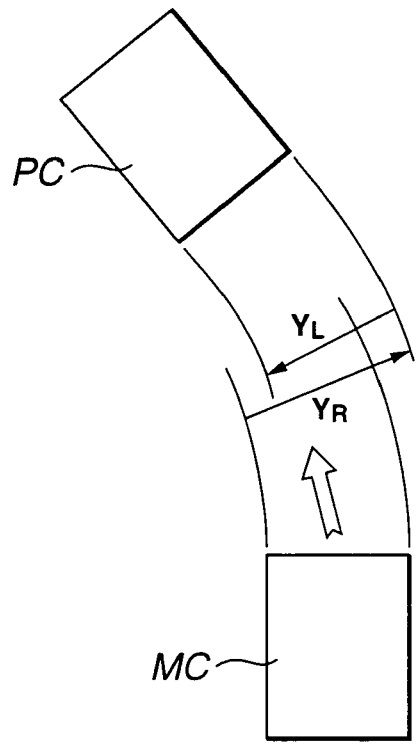
FIG. 4 is an explanatory view for explaining a lateral displacement (or movement) required for the vehicle to avoid a collision due to a steering operation.

It is noted that, Td denotes a dead time for the deceleration to be developed during the brake operation with the vehicle driver and a denotes a deceleration developed due to the brake operation with the vehicle driver. Next, travel controller 20 determines whether a steering operation by the vehicle driver causes the collision with the forward substance to be avoidable. First, at a step S9, travel controller 20 calculates the lateral displacement (movement) required to avoid the steering operation. In details, when a relationship between host vehicle MC and forward substance PC is as shown in FIG. 4, a rightward (lateral) displacement $Y_R$ required when the vehicle avoids the steering operation toward a rightward direction and a leftward lateral displacement $T_R$ required when the vehicle avoids the steering operation toward a leftward direction are expressed in equations (2) and (3), respectively.

$$Y_R = dr \cdot \tan \theta_R - dr \cdot \tan\{\tfrac{1}{2} \cdot \sin^{-1}(\phi/Vs)\} + W_b/2 + Ws \qquad (2).$$

$$Y_L = -dr \cdot \tan \theta_L + dr \cdot \tan\{\tfrac{1}{2} \cdot \sin^{-1}(\phi/Vs)\} + W_b/2 - Ws \qquad (3).$$

It is noted that, as shown in FIG. 2, $\theta_R$ denotes an angular range at a rightward end of the forward substance detected by means of forward substance sensor 14, θL denotes an angular range at a leftward end of the forward substance detected by means of forward sensor 14, $W_b$ denotes a width of the automotive vehicle, Ws denotes an offset quantity of a position at which the sensor is attached from a center of the host vehicle.

Lateral displacement Y required for avoiding the steering is set to either one of lateral displacement $Y_R$ required in a case where the steering avoidance is made in the rightward direction and lateral displacement required in a case where the steering avoidance is needed in the leftward direction which is smaller than the other.

$$Y = \min(Y_R, Y_L) \qquad (4).$$

It is noted that min( ) denotes a function which selects one of the two variables in a bracket which is smaller than the other.

Figure 5:
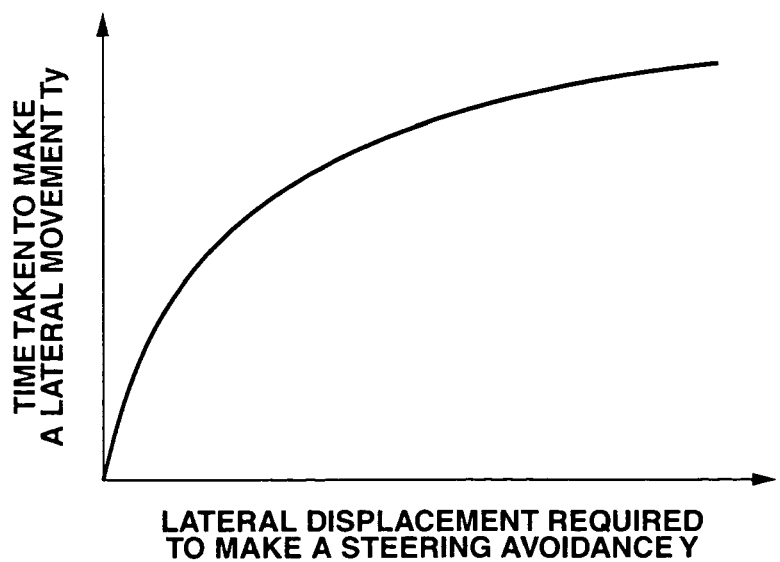
FIG. 5 is a characteristic graph representing the lateral displacement and a time it takes for the lateral displacement.

Next, at a step S10, travel controller 20 calculates a time duration $T_y$ it tales for the steering avoidance on the basis of the relationship between lateral displacement Y shown in FIG. 5 and the time $T_y$ it takes for the steering avoidance and the routine goes to a step S11. It is noted that, as shown in FIG. 5, the lateral axis denotes the lateral displacement Y required for the steering avoidance and the longitudinal axis denotes a time duration $T_y$ it takes for the lateral displacement. As the lateral displacement Y required for the steering avoidance is increased, the time duration $T_y$ required for the lateral displacement is set to be increased.

At a step S11, travel controller 20 determines whether the following equation (5) is established or not. If equation (5) is not established, travel controller 20 determines that the collision avoidance due to the steering is possible and the routine goes to a step S12. At step S12, travel controller 20 sets a steering collision avoidance flag Fs to "1". On the other hand, if the following equation (5) is established, travel controller 20 determines that it is impossible to perform the steering and the routine goes to a step S13 in which a steering collision flag Fs is reset to zero (Fs="0").

$$dr < Vr \cdot T_y \qquad (5).$$

At the next step S14, travel controller 20 determines whether the collision avoidance due to the braking is impossible and the collision avoidance due to the steering is impossible. If, at step S14, travel controller 20 determines that braking collision avoidance flag $F_B$ is "0" indicating that it is impossible to avoid collision and that steering collision avoidance flag Fs is "0" indicating that it is impossible to avoid the collision, the routine goes to a step S15. At step S15, travel controller 20 operates an automatic braking for a predetermined time duration and with a predetermined magnitude. On the other hand, if the result of determination at step S14 is either $F_B$=1 or Fs=1, the routine goes to a step S16 in which an automatic braking is released.

Figure 6:
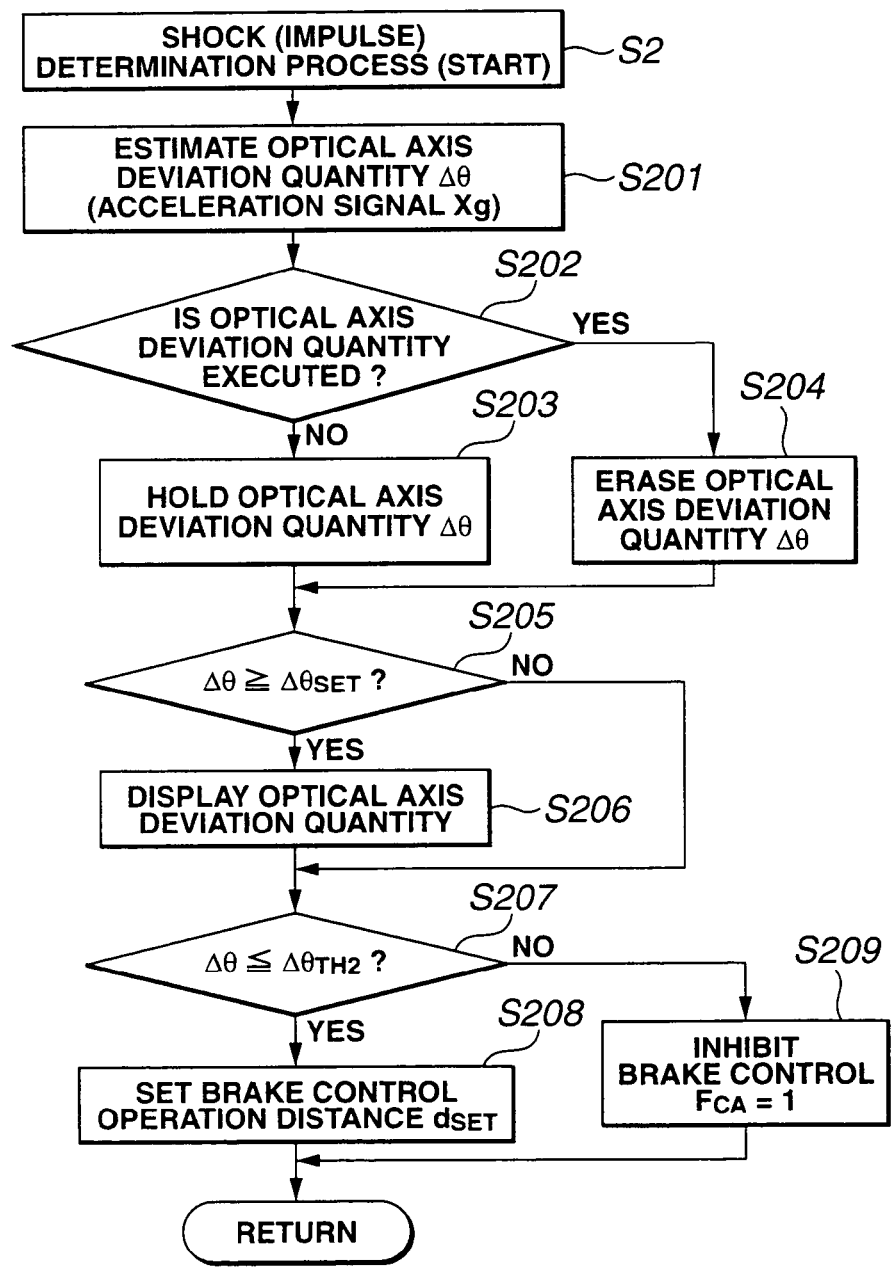
FIG. 6 is an operational flowchart representing an impulse determination procedure in the first embodiment shown in FIG. 1.
Figure 7:
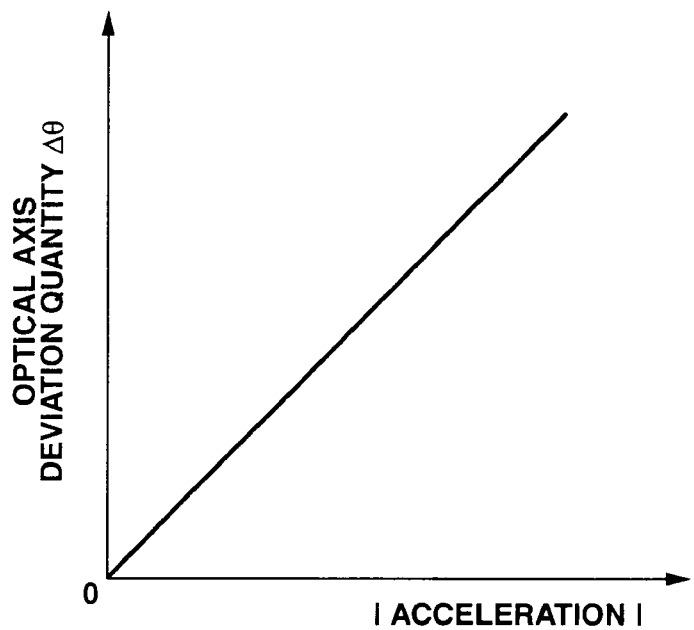
FIG. 7 is a map graph for calculating an optical axis deviation quantity.
Figure 8:
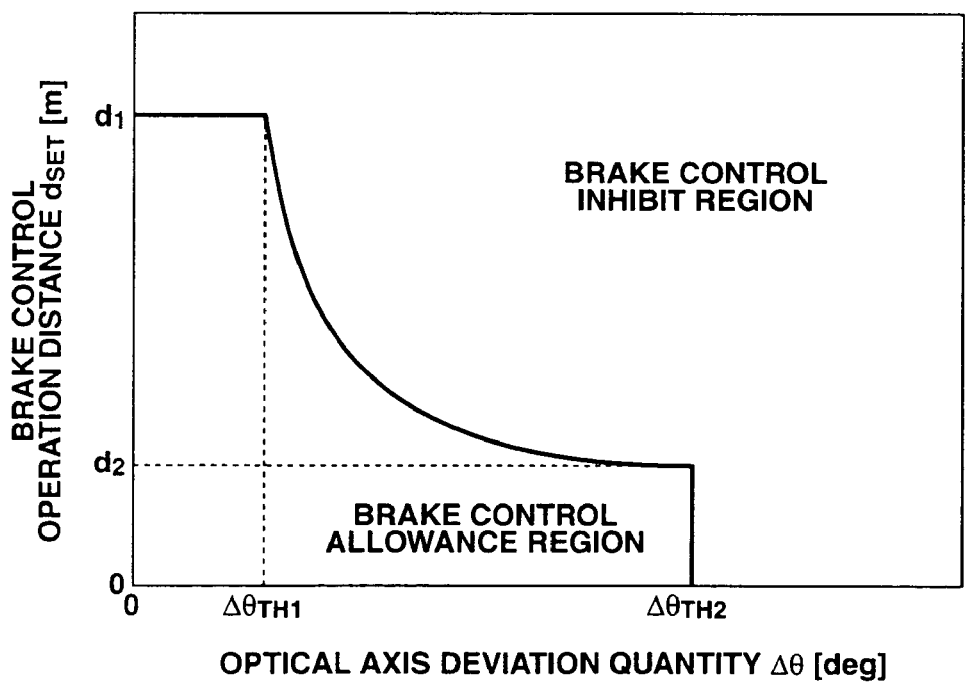
FIG. 8 is an explanatory view for explaining a relationship between an optical axis deviation quantity and a brake control operation distance.

The shock determination process at step S2 is shown in FIG. 6 will be described below. That is to say, at a step S210, travel controller 20 determines whether such a shock that the change in the detection range occurs in forward substance sensor 14. The determination of whether the shock occurs is carried out by means of an acceleration signal Xg detected by means of an acceleration signal Xg detected by acceleration sensor 15. If acceleration sensor 15 detects a deceleration equal to or larger than a predetermined value, an impulse having a magnitude such that an optical axis deviation occurs is determined and such a map as shown in FIG. 7 is referred to so as to estimate optical axis deviation quantity Δθ based on the deceleration detected by means of acceleration sensor 15 and to store its optical axis deviation quantity Δθ. It is noted that, in FIG. 7, a lateral axis denotes an absolute value of the deceleration and a longitudinal axis denotes an optical axis deviation quantity Δθ, optical axis quantity Δθ being varied linearly to the deceleration of optical axis deviation quantity Δθ. Then, the routine goes to a step S202, travel controller 20 determines whether an optical axis adjustment of forward substance sensor 14 is carried out. In a case where the optical axis adjustment is not carried out at a service factory or car dealer shop, travel controller 20 holds optical axis deviation quantity Δθ stored and the routine goes to a step S205. On the other hand, if the result of determination at step S202 is that the optical axis adjustment is carried out, the routine goes to a step S204. At step S204, travel controller 20 resets optical axis deviation quantity Δθ to "0" and the display of optical axis deviation display unit 17 is in the non-display state and the routine goes to a step S205. At step S205, travel controller 20 determines whether optical axis deviation quantity Δθ is equal to or larger than optical axis deviation $\Delta\theta_{SET}$. If $\Delta\theta \geq \Delta\theta_{SET}$ (Yes) at a step S205, the routine goes to a step S206. At step S206, travel controller 20 displays the optical axis deviation state through optical axis deviation quantity display unit 17 and the routine goes to a step S207. If $\Delta\theta < \Delta\theta_{SET}$ (No) at step S205, travel controller 20 holds the previous displayed state and the routine directly goes to a step S207. At the step S207, travel controller 20 determines whether optical axis deviation quantity Δθ is equal to or lower than a predetermined value $\Delta\theta_{TH2}$. If $\Delta\theta \leq \Delta\theta_{TH2}$ (Yes) at step S207, the routine goes to a step S208. At step S208, travel controller 20 resets a braking control inhibit flag $F_{CA}$ to "0" representing a control permission. In addition, as shown in FIG. 8, braking control operation distance $d_{SET}$ is set in accordance with optical axis deviation quantity $\Delta\theta$. Braking control operation distance $d_{SET}$ is fixed to the same distance range of $d_1$ as the state wherein the optical axis deviation is not present. If $\Delta\theta_{TH1} < \Delta\theta \leq \Delta\theta_{TH2}$ at step S205 and step S207, travel controller 20 determines that as the optical axis deviation quantity becomes larger, braking control operation distance is set to become shorter and is set to distance range d2 when $\Delta\theta = \Delta\theta_{TH2}$.

On the other hand, if a result of determination on step S07 indicates that $\Delta\theta > \Delta\theta_{TH2}$, the routine goes to a step S209. At step S209, braking control inhibit flag FCA is set to "1" representing the control inhibit to "1". Referring back to FIG. 3, steps S3 and S4 correspond to travel control inhibit section and the processes of steps S6 through S13 correspond to collision avoidance determining section (means). The processes of steps S205 through S206 correspond to detection range variation informing section (means) and the processes of steps S207 through S208 correspond to a vehicular traveling control modifying section (means). The processes of steps S2 and S201 in FIG. 3, steps S2 and S221 in FIG. 6, steps S2 and S231 in FIG. 9, and steps S2 and S241 in FIG. 10 correspond to a variation rate estimating section (means).

Hence, suppose now that the host vehicle is running under the non-operation state of the automatic braking. In this state, in a case where an optical axis deviation occurs which is larger than a predetermined value $\Delta\theta_{TH2}$ in forward substance detector 143 due to some impulse applied to the host vehicle, in the shock determination process shown in FIG. 6, travel controller 20 estimates an optical axis deviation quantity $\Delta\theta$ which is larger than predetermined value $\Delta\theta_{TH2}$. Since the optical axis adjustment is not carried out at the service factory or sales office, the routine goes from step S202 to step S203 in which stored optical axis deviation quantity $\Delta\theta$ is held. Since optical axis deviation quantity $\Delta\theta$ is equal to or larger than optical axis deviation quantity display threshold $\Delta\theta_{SET}$, the determination at step S205 causes step S206 to be advanced so that the optical axis deviation display is carried out at optical axis deviation display unit 17. Since $\Delta\theta > \Delta\theta_{TH2}$, the routine of FIG. 6 goes from step S207 to step S208 in which braking control inhibit flag $F_{CA}$ is set to "1" representing the control inhibit. Since $F_{CA}=1$ and the host vehicle is not in the automatic braking operation, in the brake control operation determination process in FIG. 3, the routine goes to step S3 to step S4 to inhibit the automatic braking so that the driver can continue the traveling in accordance with the driver's accelerator response and braking operation.

In addition, in a case where the host vehicle is traveling with the automatic braking under the operation state and some impulse is applied to the host vehicle so that an optical axis deviation larger than predetermined value $\Delta\theta_{TH2}$ occurs in forward substance sensor 14, in the shock determination process shown in FIG. 6, step transfers from a step S207 to a step S208. Thus, braking control inhibit flag FCA is set to "1" representing the control inhibit. Since the host vehicle is under the automatic braking, in the braking control operation determination process shown in FIG. 3, the routine goes from step S3 to step S5. Since $F_{CA}=1$, the determination at step S5 advances to step S6 to determine whether the braking avoidance is permitted. Then, travel controller 20 determines whether the steering avoidance by means of the driver is permitted. If travel controller 20 determines that it is avoidable in either the braking avoidance or the steering avoidance, the routine goes from step S14 to step S15 and, then, the automatic braking is released to transfer to the travel in accordance with the accelerator operation and brake operation by the driver. Hence, thereafter, a state of $\Delta\theta > \Delta\theta_{TH2}$ is continued until the optical axis adjustment is made. When $F_{CA}=1$ and the vehicle is under the automatic braking non-operation state, the routine goes from step S3 to step S4 to inhibit the automatic braking so that the travel in accordance with the driver's accelerator operation and brake operation. In details, even if forward substance sensor 14 detects relative distance dr which is equal to or shorter than braking control operation distance $d_{SET}$ and the host vehicle is traveling within the braking control allowance region, the automatic braking is inhibited and the vehicular run in accordance with the driver's accelerator operation and brake operation is continued.

As described above, in a case where the impulse having the magnitude such that the optical axis deviation occurs is determined to occur, optical axis deviation quantity $\Delta\theta$ is estimated and if this optical axis deviation quantity $\Delta\theta$ is larger than predetermined value $\Delta\theta_{TH2}$, the automatic braking is inhibited. Hence, the vehicular run control under a state in which the relative positional relationship to the forward substance due to the slight optical axis deviation cannot accurately be recognized can positively be prevented. On the other hand, suppose that, under a state wherein a slight optical axis deviation which is equal to or shorter than predetermined value $\Delta\theta_{SET}$ is generated, the host vehicle is traveling in a region of the braking control inhibit in which relative distance dr to forward substance is in excess of braking control operation distance $d_{SET}$. In this case, first, in the impulse determination process shown in FIG. 6, at step S201, optical axis deviation $\Delta\theta$ such that $\Delta\theta \leq \Delta\theta_{TH2}$ is estimated. Since no optical axis adjustment is carried out at service factory or sales office, the routine goes from step S202 to step S203 to hold optical axis deviation quantity $\Delta\theta$ stored. If optical axis deviation quantity $\Delta\theta$ is equal to or larger than optical axis display threshold value $\Delta\theta_{SET}$, the routine goes to a step S206 according to the determination of step S205 in which the optical axis deviation is displayed on an image screen of optical axis deviation quantity display unit 17. Then, the routine goes from step S205 to step S206 in which the optical axis deviation display is performed through optical axis deviation display unit 17. Then, the routine goes from a step S207 to step S209 in which braking control inhibit flag $F_{CA}$ is reset to "0" representing the allowance of the control and a distance range in accordance with an optical axis deviation quantity $\Delta\theta$ as shown in FIG. 8 is set as braking control operation distance $d_{SET}$. Since $F_{CA}=0$ and $dr > d_{SET}$, in the braking control operation determination process shown in FIG. 3, the routine goes from step S5 to step S4 at which the automatic braking is inhibited. The vehicular run is carried out in accordance with the acceleration by the driver or the braking operation by the driver. Thereafter, if relative distance dr to the forward substance is equal to or shorter than braking control operation distance $d_{SET}$ and the host vehicle runs in an allowance region of the brake control, the braking control such that the host vehicle is suppressed from approaching to the forward substance becomes possible. If $F_{CA}=0$ and $dr \leq d_{SET}$, the routine goes from step S5 to step S6. At step S6, travel controller 20 determines whether it is possible to avoid the braking by the driver. Next, travel controller 20 determines if it is possible to avoid the steering by the driver. If travel controller 20 determines that it is possible to avoid in either of the braking avoidance or the steering avoidance, the routine goes to step S14 to step S16 in which the vehicular run in accordance with the acceleration or braking operation by the driver is continued.

On the other hand, when travel controller 20 determines that the braking avoidance and the steering avoidance is impossible, the routine goes from step S14 to step S15. At step S15, travel controller 20 outputs braking pressure command value $P_{BR}$ to develop a braking hydraulic having a predetermined magnitude to braking controller 8 and the routine transfers to a host vehicle braking control. It is noted that braking control operation distance $d_{SET}$ is set to becomes smaller as optical axis deviation quantity $\Delta\theta$ becomes wider (larger). Hence, if $\Delta\theta_{TH1} < \Delta\theta \leq \Delta\theta_{TH2}$, as compared with a case where the optical axis deviation is not present, the braking control is carried out only for the relative positional relationship to forward substance which is more nearer.

As described above, in the first embodiment, in a case where some impulse is applied to the host vehicle so that a change in the detection range of forward substance sensor 14 occurs due to a deviation in the position on which the sensor to recognize the forward substance is disposed, the detection of this deviation is immediately detected and, during the vehicle not under the automatic braking, the operation of the braking control is inhibited when the host vehicle is not under the automatic braking. Such a phenomenon that the vehicular run control is continued to run with the continued change of the detection range of the sensor can be assured. When the vehicle is under the automatic braking, travel controller can determine whether the braking avoidance or steering avoidance by the driver is possible. Only in a case where travel controller 20 determines that it is possible to avoid the collision, the operation of the braking control is released. Hence, a safety vehicular travel can be assured.

Furthermore, as a detection range variation rate of the sensor to recognize the forward substance becomes larger, viz., the braking control is carried out for the nearer one of the relative positional relationships to the forward substance, the vehicular brake control is executed. As the variation quantity becomes small, the braking control is carried out for a far relative positional relationship which is remote from the relative positional relationship. Hence, without worsening of the accuracy in a forward substance position, the position of the forward substance can be detected. In addition, an optimum braking control in accordance with a state of the change in the detection range can be achieved.

Since the magnitude of the impulse applied to the forward substance sensor is detected using an acceleration signal from the acceleration sensor used in a commonly available air bag, a sensor to detect the impulse is not needed to be newly installed is not needed so that an increase in manufacturing cost can be avoided. It is noted that, in the first embodiment, the acceleration sensor is applied as acceleration detecting means (section). However, the acceleration detecting means is not limited to this. The acceleration may be calculated from the vehicle speed of the host vehicle using the vehicle speed sensor.

Second Embodiment

Next, a second preferred embodiment of the vehicular traveling control apparatus according to the present invention will be described below.

In the second embodiment, the determination of the impulse which changes the detection range of forward substance sensor 14 is carried out using a signal from a yaw rate sensor 16.

Figure 9:
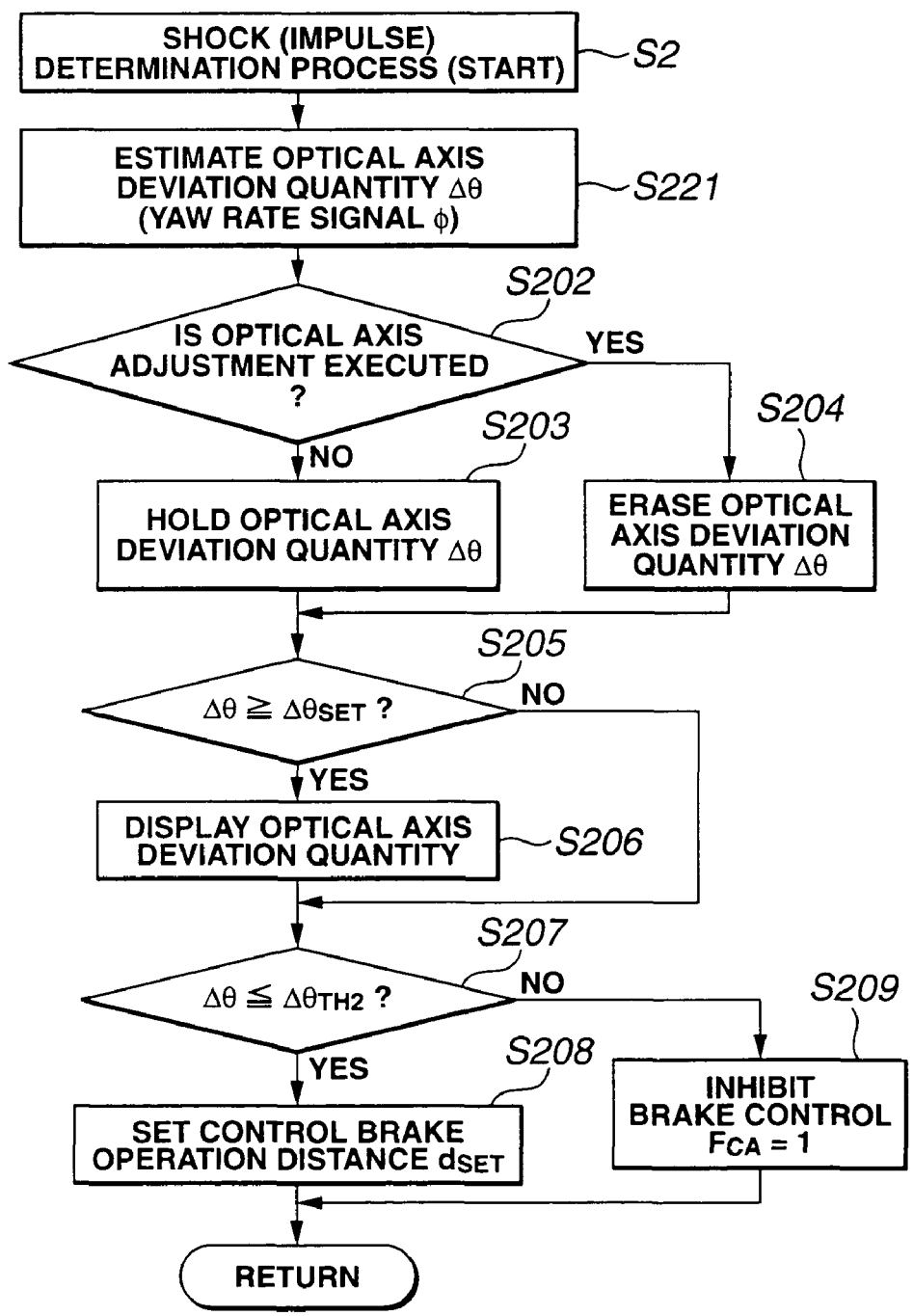
FIG. 9 is an operational flowchart representing the impulse determination procedure in a second preferred embodiment of the vehicular traveling control apparatus according to the present invention.

FIG. 9 shows an operational flowchart executed by travel controller 20 and representing the impulse determination process. In the impulse determination process in the first embodiment shown in FIG. 6, excepting the process at step S201 shown in FIG. 6 which is replaced with a step S221 shown in FIG. 9 at which an impulse having a magnitude by which the optical axis deviation occurs is detected according to a variation rate of a yaw rate $\phi$ detected by means of yaw rate sensor 16 to estimate optical axis deviation quantity $\Delta\theta$, the same processes are executed in this embodiment. Hence, the same reference numerals as shown in FIG. 9 are the same process contents in the flowchart of FIG. 6. The detailed explanation will herein be omitted.

In the second preferred embodiment, at step S221, travel controller 20 calculates the variation rate of the yaw rate $\phi$ detected by means of yaw rate sensor 16. If an absolute value of the calculated result is equal to or larger than the predetermined value, travel controller 20 determines that the impulse having the magnitude so as to generate the optical axis deviation has occurred. Then, as the absolute value of the calculated value becomes larger, the magnitude of the optical axis deviation is large. By referring to a map as shown in FIG. 7, the optical axis deviation quantity $\Delta\theta$ based on the variation rate of yaw rate $\phi$ is estimated. After storing optical axis deviation quantity $\Delta\theta$ is stored, the routine goes to a step S202. It is noted that a lateral axis of FIG. 7 denotes an absolute value of the variation rate of yaw rate $\phi$ and a longitudinal axis of FIG. 7 denotes optical axis deviation quantity $\Delta\theta$. Optical axis deviation quantity $\Delta\theta$ is set to change linearly with respect to the absolute value of the variation rate of yaw rate $\phi$.

As described above, in the second embodiment, using the yaw rate signal outputted from yaw rate sensor used in recognition of the forward substance (object), the magnitude of the impulse applied to forward substance sensor is detected. It is not necessary to install the sensor to newly detect the shock. The cost can be reduced in the same way as described in the first embodiment.

Third Embodiment

Figure 10:
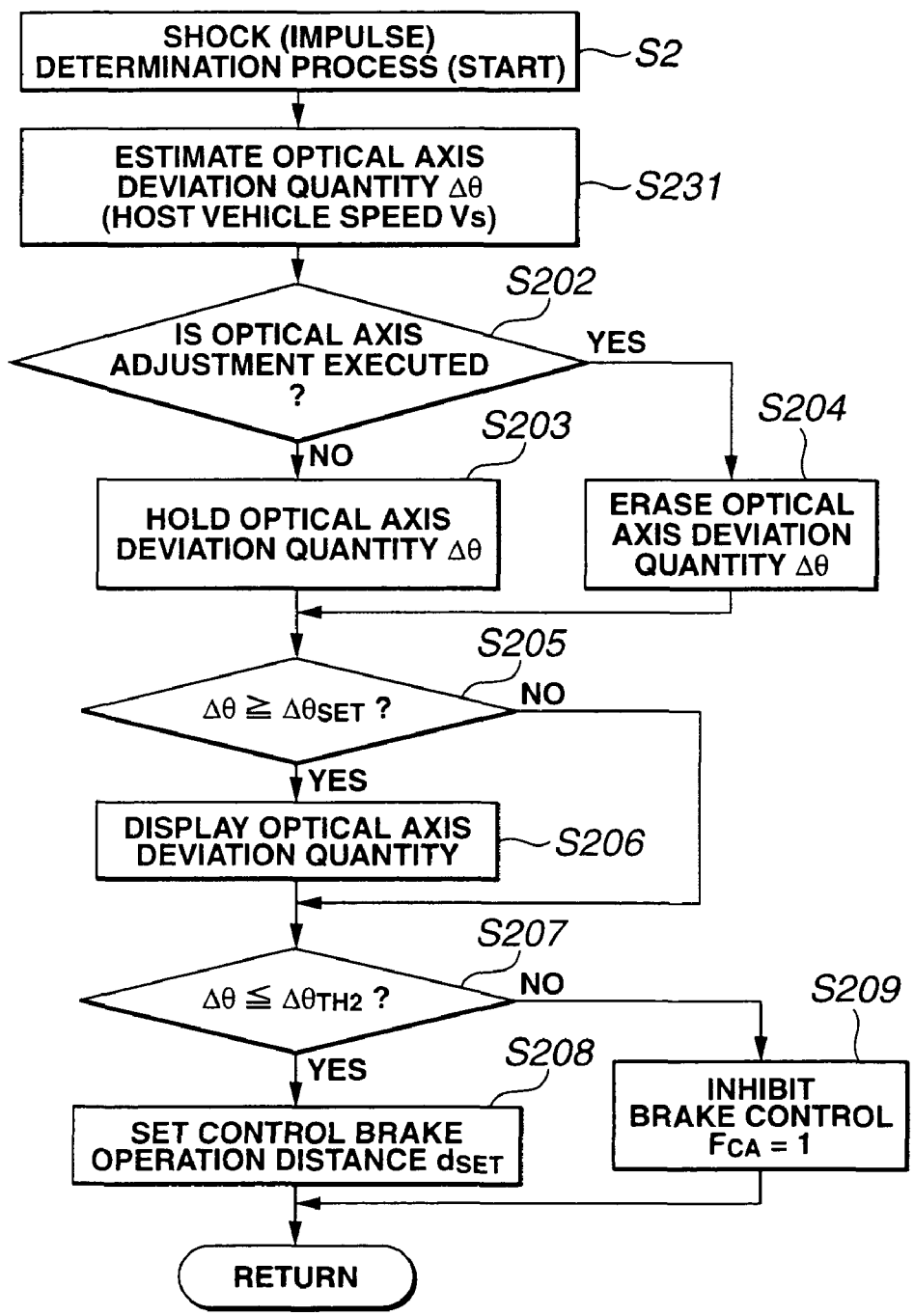
FIG. 10 is an operational flowchart representing the impulse determination procedure in a third preferred embodiment of the vehicular traveling control apparatus according to the present invention.

In a third preferred embodiment of the vehicular traveling control apparatus according to the present invention, the determination of the impulse which changes the detection range of forward substance sensor 14 is carried out using a signal from vehicle speed sensor 13. FIG. 10 shows an operational flowchart representing a procedure of the impulse determination process executed by travel controller 20. In the impulse determination process in the first embodiment shown in FIG. 6, except the process of step S201 is replaced with a process at a step S231 at which the impulse of the magnitude so as to generate the optical axis deviation is detected according to the variation rate of vehicle speed Vs, the same processes as shown in FIG. 6 are executed in FIG. 10. The same contents of the like reference numerals designate the corresponding elements and the detailed explanation thereof will herein be omitted.

In the third embodiment, at step S231, travel controller 20 calculates the variation rate of the vehicle speed of the host vehicle Vs from vehicle speed sensor 13 and determines that, in a case where the calculated value is equal to or larger than a predetermined value in a deceleration direction, travel controller 20 determines that such an impulse that the optical axis deviation has occurred in forward substance sensor 14. In addition, as the calculated value becomes larger in the speed reduction direction, travel controller 20 determines that the optical axis deviation is large and estimates optical axis deviation $\Delta\theta$ based on the variation rate of the host vehicle speed by referring to a map as shown in FIG. 7. Then, the routine goes to above-described step S202 with optical axis quantity $\Delta\theta$ stored. It is noted that, in FIG. 7, its lateral axis denotes an absolute value of the variation rate of host vehicle speed Vs and its longitudinal axis denotes optical axis deviation quantity $\Delta\theta$. Optical axis deviation quantity $\Delta\theta$ is set to be varied linearly with respect to the absolute value of vehicle speed Vs of the host vehicle.

As described above, since, in the third embodiment, the magnitude of the shock applied to forward substance sensor is detected using the variation rate of the vehicle speed of the host vehicle of the vehicle speed sensor used in almost all vehicles, it is not necessary newly to install the sensor to detect the impulse. Thus, the increase in the cost can be reduced.

Fourth Embodiment

Next, a fourth preferred embodiment of the vehicular running apparatus will herein be described below. In the fourth embodiment, the determination of the impulse which changes the detection range of forward substance sensor 14 is carried out by using the signal of forward substance sensor 14, as in the first embodiment.

Figure 11:
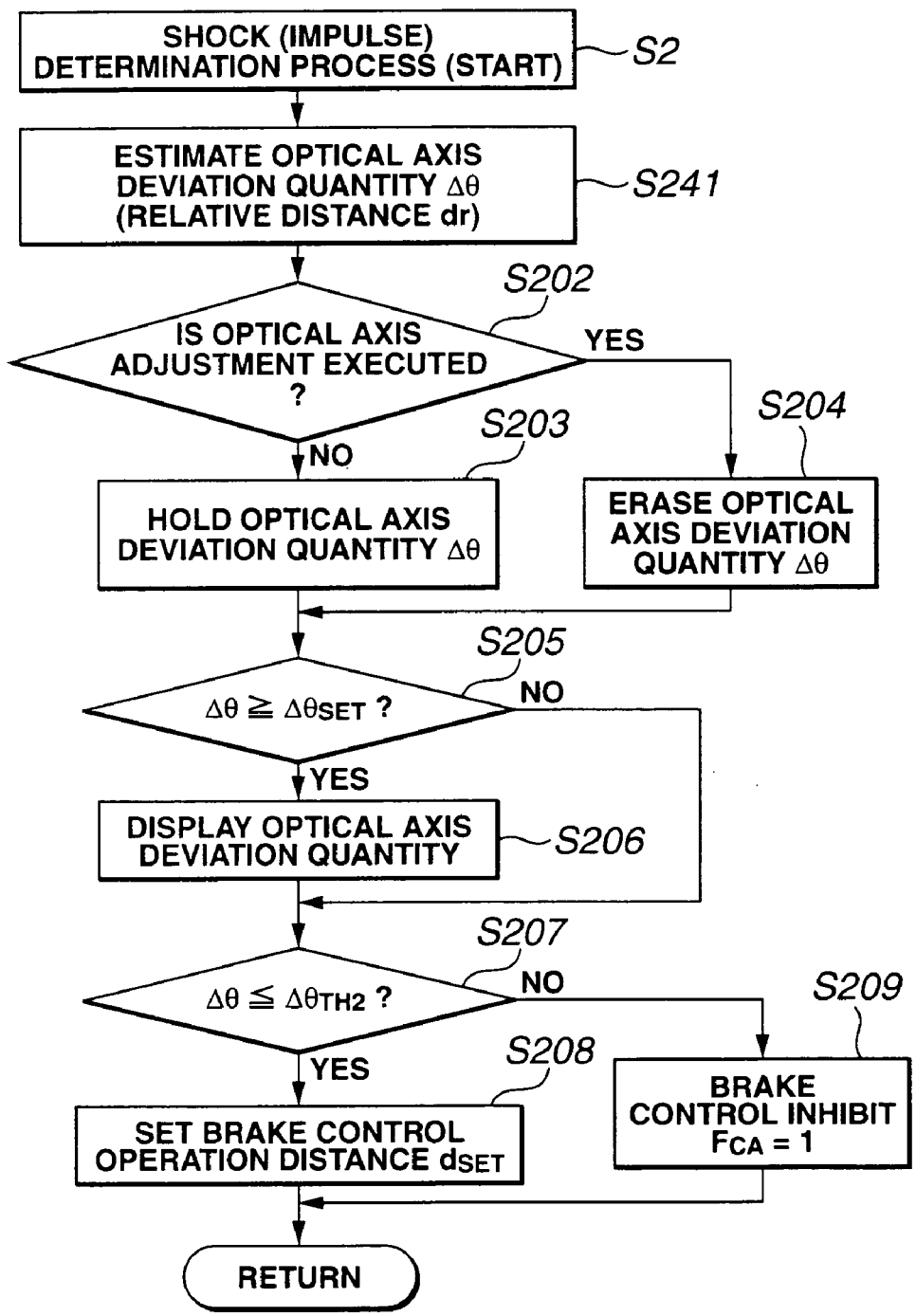
FIG. 11 is an operational flowchart representing the impulse determination procedure in a fourth preferred embodiment of the vehicular traveling control apparatus according to the present invention.

FIG. 11 shows an operational flowchart representing an impulse determination processing executed by travel controller 20. The same processing as described in the impulse determination procedure shown in FIG. 6 is executed, except the process at step S201 shown in FIG. 6 is replaced with a step S241 at which the magnitude of a step S241 at which the impulse having the magnitude such that the optical axis deviation occurs is detected to estimate optical axis deviation quantity $\Delta\theta$. The details of the other steps will herein be omitted since the same reference numerals as those shown in FIG. 6 are the same contents of processes.

In the fourth embodiment, in a case where relative distance dr as detected by forward distance sensor 14 is shorter than a predetermined value at step S241, travel controller 20 determines that the impulse having the magnitude such as to develop the optical axis in forward substance sensor 14 has occurred. In addition, as relative velocity Vr in the approaching direction at that time is larger, travel controller 20 determines that optical axis deviation quantity $\Delta\theta$ is large so that optical axis deviation quantity $\Delta\theta$ is estimated on the basis of the relative velocity in the approaching direction by referring to a map as shown in FIG. 7. The estimated optical axis deviation quantity is stored and the routine goes to step S202. It is noted that, in FIG. 7, a lateral axis denotes relative velocity Vr in the approaching direction and a longitudinal axis denotes an optical axis deviation quantity $\Delta\theta$. Optical axis deviation quantity $\Delta\theta$ is set to be varied linearly with respect to relative velocity Vr in the approaching direction. As described above, since, in the fourth embodiment, the magnitude of the impulse applied to forward substance sensor using the detected value of forward substance sensor is detected, it is not necessary newly to install the sensor to detect the impulse described above. The increase of the cost can be reduced.

It is noted that, in the fourth embodiment, travel controller 20 determines that the impulse having the magnitude such as to develop the optical axis is generated when relative distance to the forward substance is equal to or shorter than the predetermined value. However, the present invention is not limited to this. When the collision avoidances due to the braking and due to the steering are impossible and it is under the automatic braking, travel controller 20 may determine that the impulse has occurred in the sensor to recognize the forward substance after the end of the automatic braking. In this case, travel controller 20 may determine that the impulse having the magnitude as to develop the optical axis deviation when the relative velocity is equal to or larger than the predetermined value in the approaching direction and may determine that, as the relative velocity in the approaching direction becomes higher, the optical axis deviation quantity becomes larger. Thus, even in a case where such a state wherein the detection of the forward direction becomes impossible occurs after the detection that the collision avoidance becomes impossible, the estimation such that the collision has developed becomes possible. Hence, the accurate detection of the generation of the impulse having the magnitude that the optical axis deviation has occurred can be carried out.

Fifth Embodiment

Figure 12:
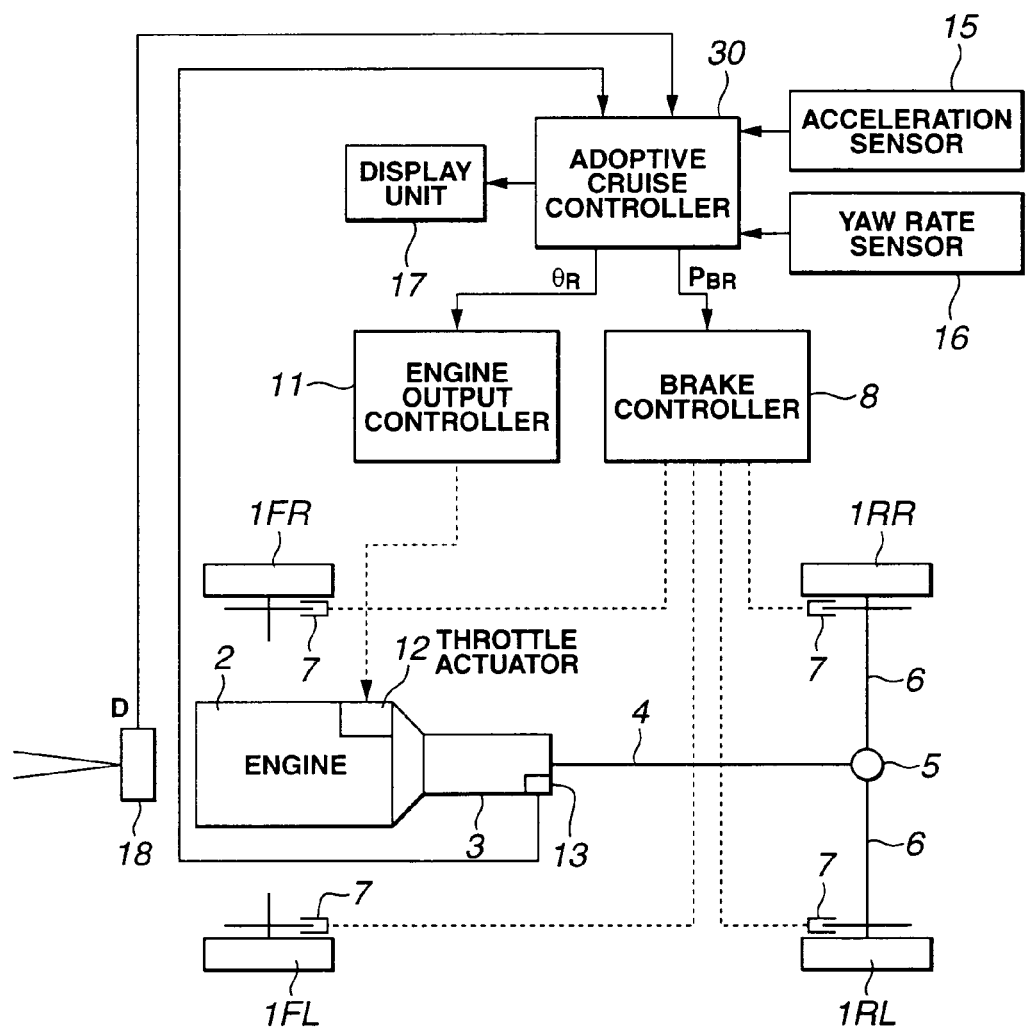
FIG. 12 is a rough system configuration view of the vehicular traveling control apparatus in a fifth preferred embodiment according to the present invention.

In a fifth preferred embodiment of the vehicular traveling control apparatus and method for the present invention according to the present invention, the present invention is applicable to a front-engine-rear-drive (FR) car in which an inter-vehicle distance control apparatus is mounted. That is to say, as shown in FIG. 12 which shows a rough configuration of the vehicular traveling control apparatus. That is to say, as appreciated from FIG. 12, an engine output controller 11 is installed which controls an output of the engine and, in place of forward substance sensor 14 having the structure of a scanning system in the first embodiment, another type of forward distance sensor 18 is installed, i.e., a radar type forward distance sensor 18 is installed. In addition, in this embodiment, an adaptive cruise controller 30 is disposed which controls the host vehicle speed Vs by setting a target vehicle speed so that an inter-vehicle distance gives a target inter-vehicle distance when the vehicle traps another vehicle traveling in front of the vehicle and controls the vehicle speed to make the host vehicle speed Vs coincident with a set vehicle speed $V_{SET}$ set by the driver. Except these elements, the other structure is generally the same as described in the first embodiment shown in FIG. 1. The same reference numerals as those described in the first embodiment designate the like reference numerals and its detailed explanation will be omitted herein.

Forward substance sensor 18 constitutes a structure of a laser type by sweepingly radiating laser light beams in a predetermined radiation range (for example, 9° in a horizontal direction and 3° in a vertical direction) and by receiving a reflected light beam and detecting an inter-vehicle distance D between the host vehicle and a preceding vehicle (the other vehicle) running in the forward detection range. Forward substance sensor 18 thus detects inter-vehicle distance between the host vehicle and the preceding vehicle. Then, a time variation of inter-vehicle distance D calculates relative velocity $\Delta V$ between the preceding vehicle and the host vehicle. This forward substance sensor 18 is attached onto a vehicular front portion of the host vehicle. Forward substance sensor 18 is usually attached on a vehicular front end by means of a fixture with such a high accuracy of an allowable error range from a longitudinal axis line (for example, ±0.5°) with respect to the forward detecting output range. Due to some application of the impulse on the vehicle, the optical axis direction is deviated toward the right and left direction in excess of the allowance error direction from the longitudinal axial direction, travel controller determines erroneously that another vehicle passing obliquely front direction traveling on an adjacent traffic lane is the preceding vehicle located in front of the vehicle on the same traffic lane. In addition, the preceding vehicle cannot be recognized. It is impossible to accurately detect a relative positional relationship to the preceding vehicle cannot accurately be detected.

Host vehicle speed Vs outputted from vehicle speed sensor 13, inter-vehicle distance D outputted from forward substance sensor 18, a relative velocity $\Delta V$, an acceleration Xg outputted from acceleration sensor 15, and a yaw rate φ outputted from yaw rate sensor 16 are inputted into adaptive cruise controller 30. Travel controller 20 determines whether the impulse having the magnitude so as to vary the detection range of forward substance sensor 18 is applied on the vehicle on the basis of any one of the signals inputted by vehicle speed sensor 13, forward substance sensor 18, acceleration sensor 15, and yaw rate sensor 16 and optical axis deviation quantity Δθ from forward direction substance sensor 18. Then, adaptive cruise controller 30 sets the target vehicular velocity so that the inter-vehicle distance gives the target inter-vehicle distance and controls the vehicular velocity. When the other vehicle traveling in front of the vehicle and on the same traffic lane is not trapped, adaptive cruise controller 30 outputs a braking pressure command value $P_{BR}$ and a target throttle valve θ* to a braking controller 8 and engine output controller 11.

Figure 13:
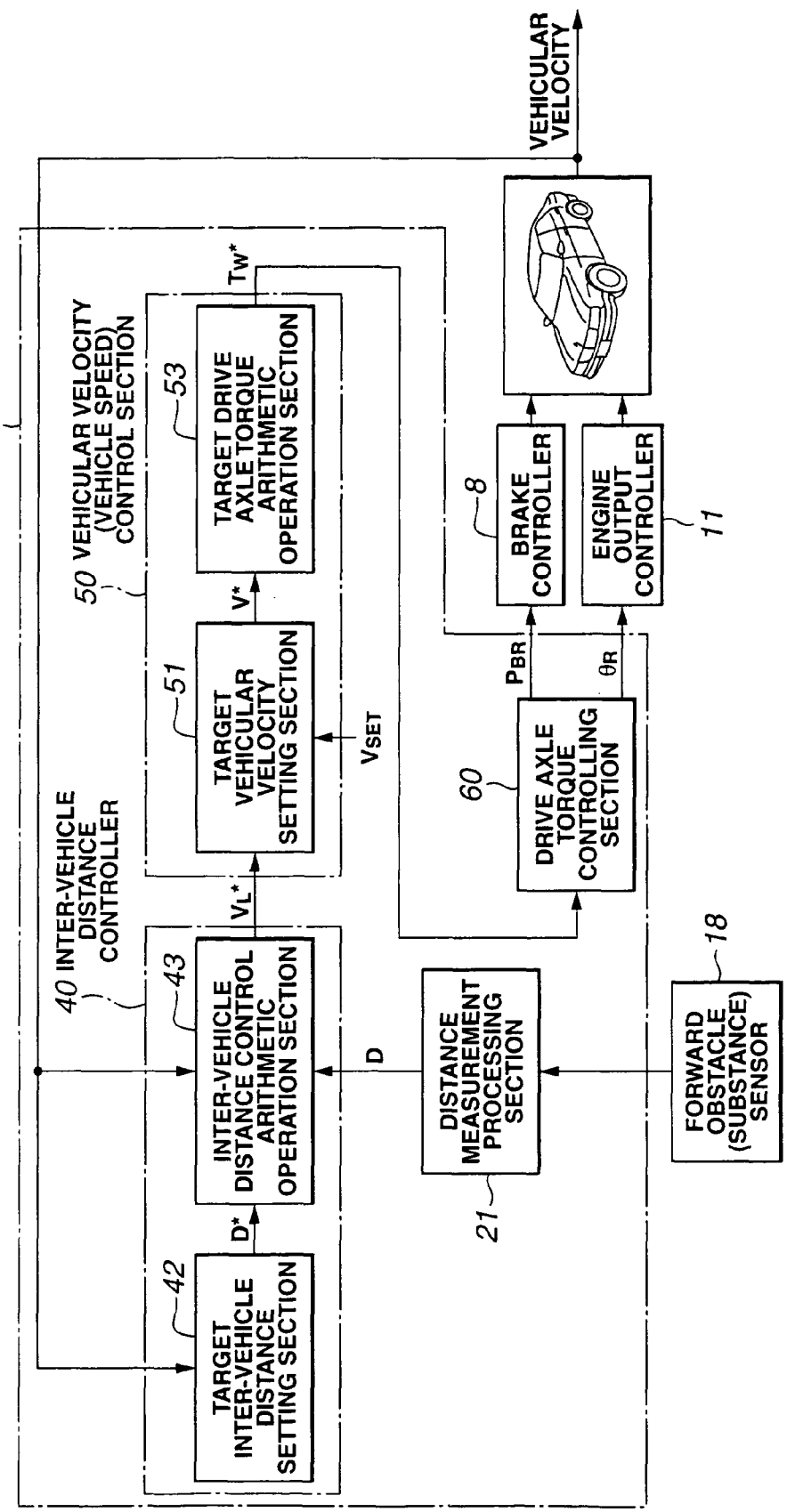
FIG. 13 is a schematic functional block diagram of an adaptive cruise control apparatus to which the vehicular traveling control apparatus according to the present invention shown in FIG. 12.

Adaptive cruise controller 30 is constituted by a microcomputer and its peripheral circuit. A software form of the microcomputer constitutes a control block diagram shown in FIG. 13. This control block measures a time duration from a time at which the laser light beam is radiated and to a time at which the reflected laser light beam is received by sweeping the laser light beams with forward substance sensor 18. The control block diagram includes a measured signal processing block 21 which calculates inter-vehicle distance D to the preceding vehicle; an inter-vehicle distance controlling section 40 which calculates target vehicle speed $V_L$* for inter-vehicle distance D to be maintained at a target inter-vehicle distance D* on the basis of inter-vehicle distance D calculated by distance measured signal processing section 21, host vehicle speed Vs, and relative velocity ΔV; a vehicular velocity control section 50 which calculates a target drive axle torque Tw* on the basis of target vehicle speed $V_L$* calculated by inter-vehicle distance controlling section 40; a vehicular velocity; an inter-vehicle distance controlling section 40 which calculates throttle opening angle command value $θ_R$ and braking pressure command value $P_{BR}$ for throttle actuator 12 and brake actuator 27 on the basis of target drive axle torque Tw* calculated by vehicle velocity controlling section 50; and a drive axle torque controlling section 60 which calculates throttle opening angle $θ_R$ and braking pressure command value $P_{BR}$ on the basis of target drive torque T.

Inter-vehicle controlling section 40 calculates includes: a target inter-vehicle distance setting section 42 which calculates target inter-vehicle distance D* between the preceding vehicle and the host vehicle on the basis of the preceding vehicle velocity Vt calculated from vehicle speed Vs and the calculated relative velocity ΔV; and an inter-vehicle distance control arithmetic operation section 43 which calculates target vehicle speed VL* to make inter-vehicle distance D coincident with target inter-vehicle distance D* on the basis of target inter-vehicle distance D* calculated by target inter-vehicle distance setting section 42, actual inter-vehicle distance D inputted from distance measured signal processing section 21, and host vehicle speed Vs.

It is noted that target inter-vehicle distance setting section 42 calculates a target inter-vehicle distance under a following travel to the preceding vehicle, at a constant vehicle speed, a constant inter-vehicle distance, and a constant inter-vehicle distance, namely, a steady state target inter-vehicle distance D* between the preceding vehicle and the host vehicle. In this embodiment, in order to maintain an inter-vehicle time duration constant, a steady target inter-vehicle distance D* in accordance with the following equation (6).

$$D^* = Vt \times Th \qquad (6),$$

wherein Vt denotes a preceding vehicle speed and Th denotes a inter-vehicle time duration.

In addition, inter-vehicle distance control arithmetic operation unit 43 calculates a target vehicular velocity $V_L$* to follow the preceding vehicle maintaining inter-vehicle distance D at target inter-vehicle distance D* on the basis of inter-vehicle distance D and relative velocity ΔV using the following equation.

$$V_L^* = K_L(D-D^*) + Kv(\Delta V - \Delta V^*) + Vt \qquad (7).$$

In equation (7), $K_L$ denotes an inter-vehicle distance and Kv denotes a relative velocity control gain.

A vehicular velocity control section 50 sets a target vehicle speed $V_L$* from either of target vehicle speeds, one of them bring inputted from inter-vehicle distance controlling section 40 and the other being a set vehicle speed $V_{SET}$ set by the driver, which is smaller than the other when the vehicle falls in a preceding vehicle following control mode. When no preceding vehicle is trapped, a target vehicle speed (velocity) setting section 51 sets set vehicle speed $V_{SET}$ set by the driver as target vehicle speed V*. In addition, a target drive axle torque calculating section 53 calculates target drive axle torque Tw* to make vehicle speed Vs coincident with target vehicle speed V* set by target vehicular speed setting section 51.

Drive axle torque controlling section 60 calculates throttle opening angle command value $θ_R$ and brake liquid pressure command value $P_{BR}$ to achieve target drive torque Tw*, outputs throttle opening angle command value $θ_R$ to engine output controller 11, and outputs brake liquid pressure command value $P_{BR}$ to brake controller 8. It is noted that inter-vehicle distance controlling section 40, vehicular velocity control section 50, and a drive axle torque controlling section 60 constitute running controlling means (or a running controlling section).

Figure 14:
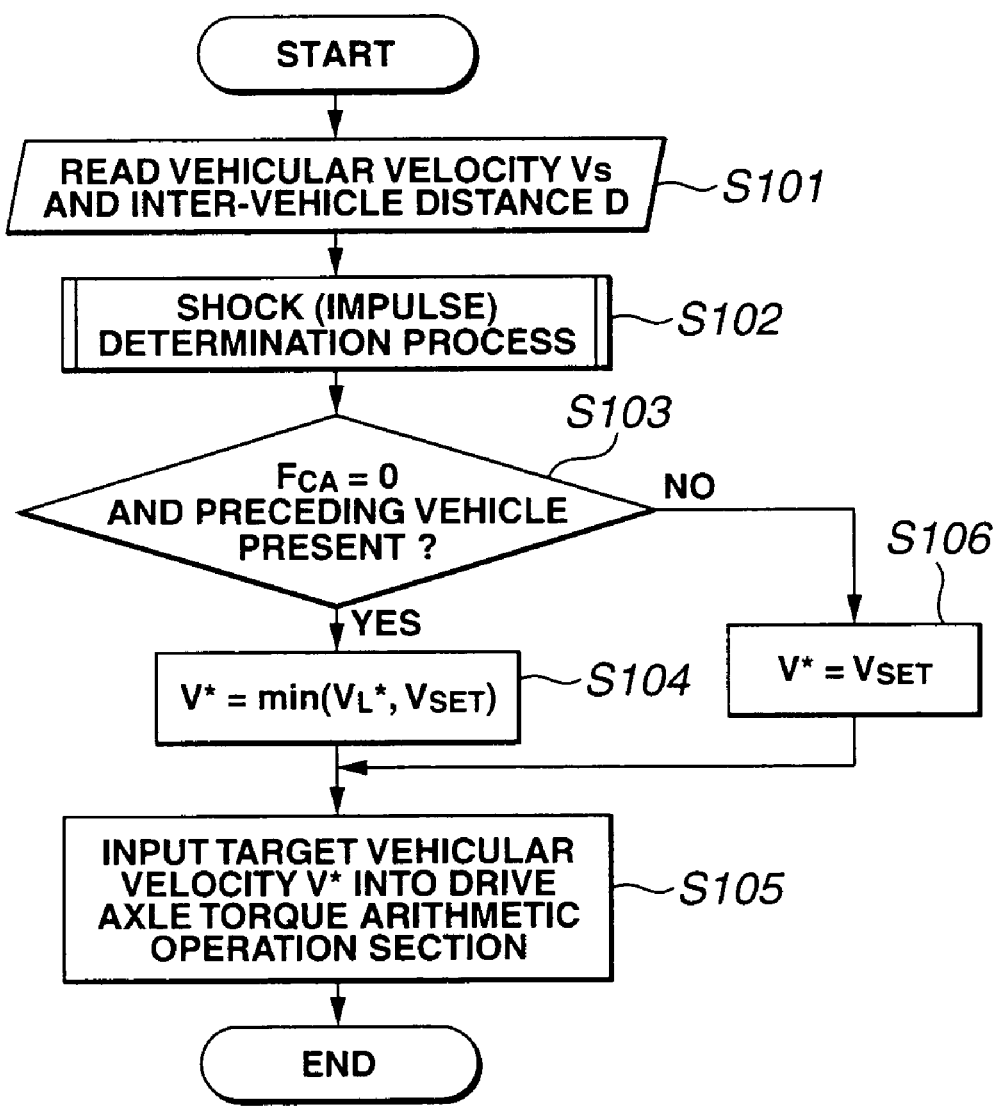
FIG. 14 is an operational flowchart representing a target vehicle speed setting procedure executed by a target vehicle speed setting section shown in FIG. 13 in the fifth embodiment.

In addition, a target vehicle speed setting section 51 executes a target vehicular velocity setting procedure shown in FIG. 14. This target vehicular velocity setting procedure is executed as a timer interrupt processing for each predetermined period of time (for example, 10 milliseconds). That is to say, at a step S101, target vehicular velocity setting section 51 reads an inter-vehicle distance D to the preceding vehicle detected by forward substance sensor 18 and the routine goes to a step S102. Thereafter, the impulse determination procedure detects the impulse varying the detection range to forward substance sensor 18, thus the setting of the inhibit determination of the inter-vehicle distance control and of a detection limit $D_{MAX}$ for the inter-vehicle distance.

At a step S103, target vehicle speed setting section 51 determines if the vehicle is now under the following control mode. This determination is carried out depending upon whether the preceding vehicle is detected by means of forward substance sensor 18 and inter-vehicle distance control inhibit flag $F_{CA}$ is reset to "0" representing the allowance of the control and inter-vehicle distance D detected by means of forward substance sensor 18 is equal to or below inter-vehicle distance detection limit $D_{MAX}$. If $F_{CA}=0$ and $D \leq D_{MAX}$, target vehicle speed setting section 51 transfers to a step S104 determining that the preceding vehicle is detected and the following control is executed. At step S104, vehicle speed setting section 51 compares the magnitudes of target vehicle speed $V_L$* calculated at equation (7) with set vehicle speed $V_{SET}$ by means of inter-vehicle distance control arithmetic operation section 43 and sets one of the two magnitudes which is smaller than the other as target vehicle speed V* and the routine goes to a step S105. At step S105, target vehicle speed V* is inputted to target drive axle torque calculating section 53 and the timer interrupt routine is ended. Then, the flow of this routine shown in FIG. 14 is ended and returns to a predetermined main program.

$$V^* = \min(V_L^*, V_{SET}) \qquad (8).$$

In equation (8), min( ) denotes a function which selects one of the variables recited within bracket which is smaller than the other.

On the other hand, when a determination result of step S103 is either $F_{CA}=1$ or $D>D_{MAX}$, target vehicle speed setting section 51 determines that it is now in the inter-vehicle distance control inhibit state or the preceding vehicle is not detected and the routine goes to a step S106. AT step S106, set vehicle speed $V_{SET}$ set by the driver is target vehicle speed V* and, then, the routine goes to step S105.

Figure 15:
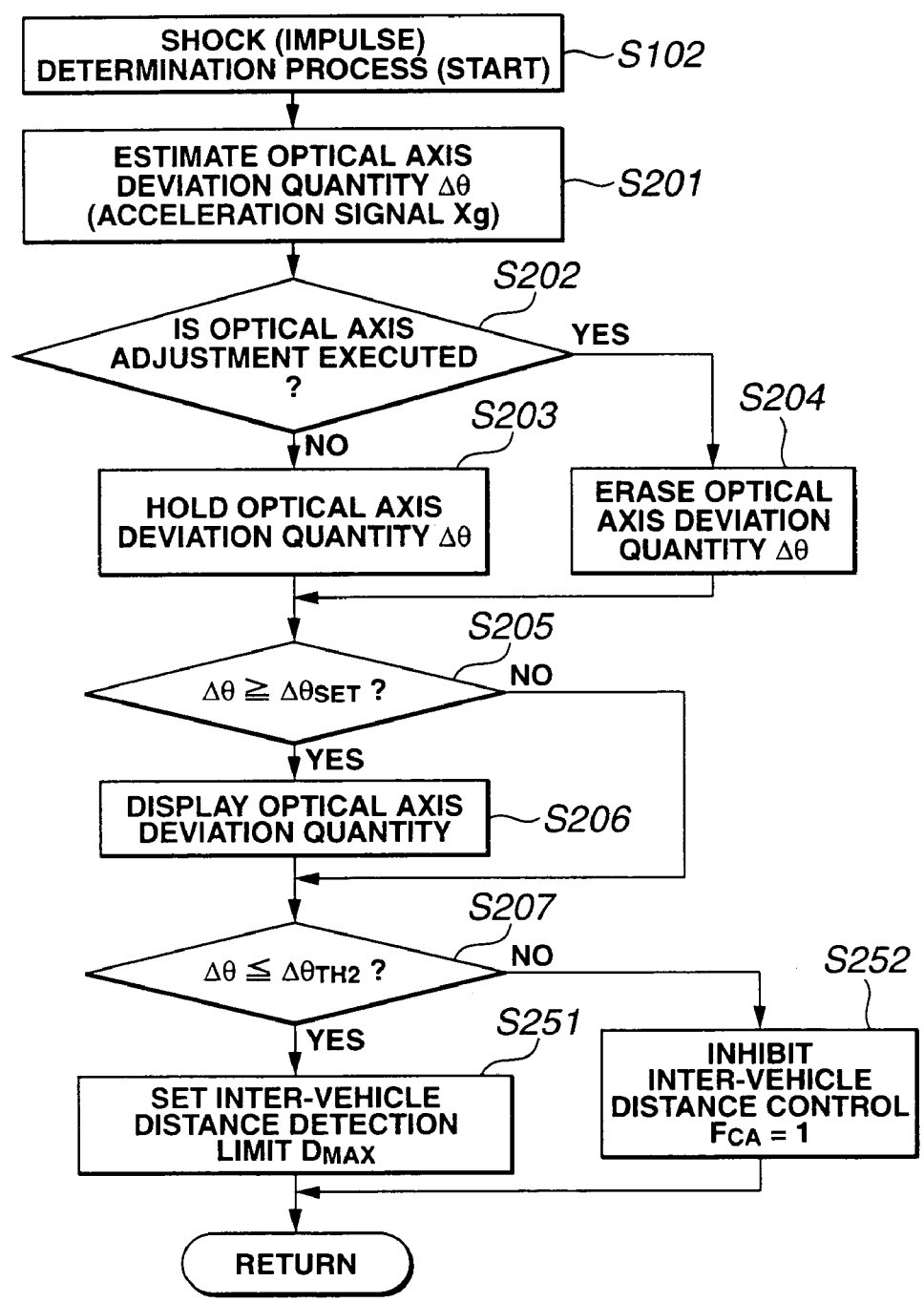
FIG. 15 is an operational flowchart representing the impulse determination procedure in the fifth embodiment shown in FIG. 12.

FIG. 15 shows an operational flowchart representing the optical axis deviation determination processing of step S102. In the impulse determination procedure in the first embodiment shown in FIG. 6, the processes of steps S208 and S209 are replaced with a step S251 at which an inter-vehicle distance detection limit $D_{MAX}$ and with a step S252 at which the inter-vehicle distance control is inhibited. Except these steps, the structure and the other steps in the case of the fifth embodiment are the same as those described in the first embodiment. The details of these structure and the other steps will herein be omitted.

Figure 16:
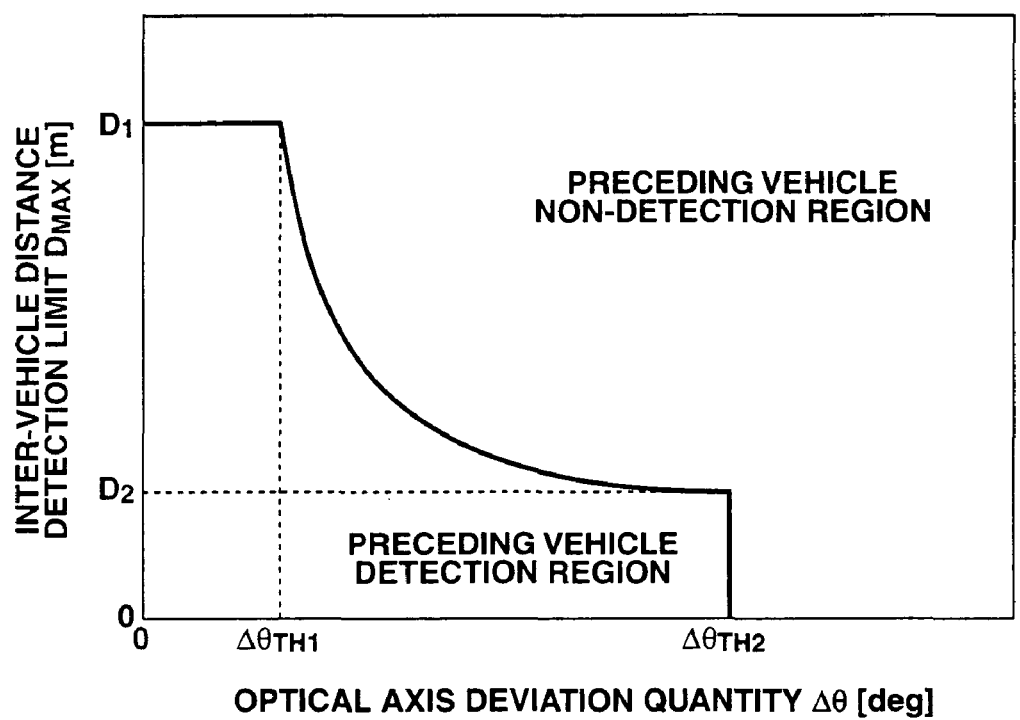
FIG. 16 is a characteristic graph representing a relationship between an inter-vehicle distance detection limit and the optical axis deviation quantity in a case of the fifth embodiment shown in FIG. 12.

At a step S107, target vehicle speed setting section 50 determines whether optical axis deviation quantity $\Delta\theta$ is equal to or shorter than predetermined value $\Delta\theta_{SET}$. If $\Delta\theta \leq \Delta\theta_{TH2}$, the routine goes to a step S251. At step S251, target vehicle speed setting section 50 resets inter-vehicle distance inhibit flag $F_{CA}$ is reset to a logical "0" representing the allowance of the control and inter-vehicle distance detection limit $D_{MAX}$ in accordance with the optical axis deviation $\Delta\theta$ as shown in FIG. 16. On the other hand, when $\Delta\theta > \Delta\theta_{TH2}$ as the result of determination at step S207 (No), the routine goes to a step S252. At step S252, inter-vehicle distance inhibit flag $F_{CA}$ is set to a logical "1" representing that inter-vehicle distance inhibit flag $F_{CA}$ indicates the control inhibit so as not to operate the inter-vehicle distance control.

Hence, suppose now that the host vehicle carries out the optical adjustment at the service factory and sales office and the vehicle is traveling with the optical axis deviation not developed in forward substance sensor 18. In this case, at the impulse determination procedure shown in FIG. 15, the routine goes from step S202 to step S204. Then, the stored optical axis deviation quantity $\Delta\theta$ is reset to zero and the optical axis display is set to the non-display. Since optical axis deviation quantity $\Delta\theta$ is zero, the routine goes from step S207 to step S251 to reset inter-vehicle distance to the logical "0" representing the control allowance and inter-vehicle distance control inhibit flag $F_{CA}$ is reset to the logical "0" and inter-vehicle distance D1 is set to inter-vehicle distance detection limit $D_{MAX}$, as shown in FIG. 16. In a case where the host vehicle does not detect the preceding vehicle, forward substance sensor 28 detects inter-vehicle distance D which is larger than inter-vehicle distance larger than inter-vehicle distance detection limit $D_{MAX}$. Hence, in the target vehicle speed setting procedure shown in FIG. 14, the routine goes from step S103 to step S106. After set vehicle speed $V_{SET}$ set by the driver is set as target vehicle speed V*, the routine goes to step S105 in which target vehicle speed V* is set target vehicle speed V*. When target vehicle speed V* is inputted to a target drive axel torque calculating section 53. Thus, the vehicular control as to make the vehicle speed Vs coincident with the set vehicle speed set by the driver.

Under this state, suppose that a large optical axis deviation than $\theta_{TH2}$ is developed on forward substance sensor 18 with some impulse applied to forward substance sensor 18. In the impulse determination process shown in FIG. 15, a value larger than predetermined value in the deceleration direction at step S201 is detected to estimate optical axis deviation quantity $\Delta\theta$ larger than predetermined value $\Delta\theta_{TH2}$. Next, the routine goes from step S202 to step S203 at which the stored optical axis deviation quantity $\Delta\theta$ is held. Since optical axis deviation quantity $\Delta\theta$ is equal to or larger than optical axis deviation display threshold value $\Delta\theta_{SET}$, the determination at step S205 causes the routine to go to step S206 to display the optical axis deviation through optical axis deviation display unit 17. Since $\Delta\theta > \Delta\theta_{TH2}$, the routine goes to a step S207 to a step S208. Inter-vehicle (distance) control inhibit flag $F_{CA}$ is set to "1" representing the control inhibit. Since $F_{CA}=1$, in the target vehicle speed setting procedure shown in FIG. 14, the routine goes from step S103 to step S106. After the set vehicle speed $V_{SET}$ set by the driver is set as target vehicle speed V* and the routine goes to step S105. When target vehicle speed V* is inputted to target drive axle torque calculating section 53. Thus, even if inter-vehicle distance D is equal to or shorter than inter-vehicle distance detection limit $D_{MAX}$, the adaptive cruise control (following run control) is not operated and such a vehicular travel control that host vehicle speed Vs is made coincident with set vehicle speed $V_{SET}$ set by the driver is continued.

As described above, in a case where travel controller 20 determines that the impulse having the magnitude such that the optical axis deviation occurs is developed, optical axis deviation quantity $\Delta\theta$ is estimated. If this optical axis deviation quantity $\Delta\theta$ is larger than predetermined value $\Delta\theta_{TH2}$, the inter-vehicle distance control is inhibited. The adaptive cruise control traveling with the accurate recognition of the inter-vehicle distance to the preceding vehicle disabled due to the large optical axis deviation can be prevented.

On the other hand, suppose that the vehicle is traveling under a state wherein a slight optical axis deviation in forward substance sensor 18 shorter than predetermined value $\Delta\theta_{TH2}$. In this case, in the impulse determination processing shown in FIG. 15, the routine goes from step S205 to step S206 and stored optical axis deviation quantity $\Delta\theta$ is held. If optical axis deviation quantity $\Delta\theta$ is equal to or larger than optical axis deviation display threshold value $\Delta\theta$SET, the determination of step S205 causes the routine to go to step S209. As shown in FIG. 16, inter-vehicle distance in accordance with optical axis deviation quantity $\Delta\theta$ is set as inter-vehicle distance detection limit $D_{MAX}$.

When forward substance sensor 18 detects inter-vehicle distance D which is shorter than inter-vehicle distance detection limit $D_{MAX}$ and the host vehicle detects the preceding vehicle, in the target vehicle speed setting procedure shown in FIG. 14, the routine goes from step S103 to step S104 to set target vehicle speed V* to follow the preceding vehicle while inter-vehicle distance D maintained at target inter-vehicle distance D*. Next, the routine goes to step S105 at which the following control to the preceding vehicle is carried out by inputting target vehicle speed V* to target drive axle torque calculating section 53. It is noted that inter-vehicle distance detection limit $D_{MAX}$ is set to a smaller value as optical axis deviation quantity $\Delta\theta$ becomes larger. If, $\Delta\theta_{TH1} < \Delta\theta \leq \Delta\theta_{TH2}$, the adaptive cruise control (following control to the preceding vehicle) is carried out only in a case where the relative position relationship to the preceding vehicle is closer, as compared with no presence of the optical axis deviation. In the fifth embodiment, in a case where the variation in the detection range occurs in the sensor due to the deviation in position of the attachment of the sensor to recognize the preceding vehicle with some impulse added onto the vehicle, the immediate detection thereof is made and the inter-vehicle distance control is inhibited. Hence, the following control to the preceding vehicle is operated with the detection range of the sensor changed cannot be operated. Hence, the accurate prevention of the unfavorable following run control to the preceding vehicle can be achieved. In a case where no variation of the detection range is not found, the usual following run control can be achieved. Thus, the vehicular run with no sense of incompatibility given to the driver can be achieved.

Furthermore, since the magnitude of the impulse applied to the sensor to recognize the preceding vehicle is detected using the acceleration signal used in an air bag system now currently available, it is not necessary to newly install the shock detection sensor. The increase in the manufacturing cost can be prevented from occurring. It is noted that, in the fifth embodiment, the case in which the acceleration signal of the acceleration sensor is used at step S201 in the impulse determination processing of FIG. 15. However, the present invention is not limited to this. In the same way as step S221 in the second embodiment shown in FIG. 9, the variation rate of the yaw rate detected by means of yaw rate sensor may be used. In addition, the variation rate of the host vehicle detected by means of the vehicle speed sensor in the same way as step S231 in the third embodiment shown in FIG. 10 may be used. Furthermore, the inter-vehicle distance and relative velocity detected by means of forward substance sensor may be used in the same way as step S241 in the fourth embodiment shown in FIG. 11.

It is noted that, in each of the first through fifth embodiments, when travel controller determines that the optical axis adjustment has been carried out in the impulse determination processing shown in FIGS. 6, 8 through 11, and 15, at step S204, optical axis deviation quantity $\Delta\theta$ is reset to "0". The present invention is not limited to this. After the determination that the detection range has been varied due to the collision, the vehicle may be traveled by a distance required for the detection range variation determination process based on the detection trajectory of the stopped substance (delineator at the front road side). In a case where the variation in the detection range is not detected, stored optical deviation quantity $\Delta\theta$ may be reset to "0".

In each of the first through fifth embodiments, when optical axis deviation quantity $\Delta\theta$ is equal to or larger than optical axis deviation display threshold value $\Delta\theta_{SET}$, the immediate display that the optical axis has been deviated on the optical axis deviation display unit installed within a passenger compartment. However, the present invention is not limited to this. With the optical axis deviation state stored in the optical axis display unit, when a diagnosis apparatus is connected to the optical display unit at a service factory or sales office (shop), the diagnosis apparatus may display that it is now in the optical axis deviation state. It is noted that the optical axis deviation state may be monitored or warned to a user through a buzzer or vocal sound.

Furthermore, a case where a laser radar is used as forward substance sensor 14 has been described in each of the first through fifth embodiments. However, the present invention is not limited to this. Another distance measuring apparatus such as a millisecond wavelength radar may be used. In each of the first through fifth embodiments, the present invention is applicable to the rear road wheel drive vehicle. However, the present invention is applicable to a front road wheel drive vehicle. A case where engine 2 is applicable as a revolution drive source has been described. However, the present invention is not limited to this. An electric motor is applicable. Furthermore, the present invention is applicable to a hybrid vehicle in which the engine and electric motor(S) are used.

The entire contents of a Japanese Patent Application No. 2003-145202 (filed in Japan on May 22, 2003) are herein incorporated by reference. The scope of the invention is defined with reference to the following claims.

What is claimed is:

1. A vehicular traveling control apparatus, comprising:
  a vehicular forward substance detecting section that detects a forward substance located in a forward direction of the vehicle;
  a vehicular travel controlling section that performs a vehicular travel control on the basis of a relative positional relationship between the forward substance detected by the vehicular forward substance detecting section and the vehicle;
  an impulse detecting section that detects such an impulse that a detection range of the vehicular forward substance detecting section is varied has been applied to the vehicular forward substance detecting section;
  wherein the vehicular travel controlling section estimates an optical axis deviation quantity of the detection range of the vehicular forward substance detecting section when the impulse detecting section detects that the impulse has been applied to the forward substance detecting section; and
  a running control varying section that varies a control method of the vehicular travel controlling section in accordance with the optical axis deviation quantity estimated by the vehicular travel controlling section.

2. A vehicular traveling control apparatus as claimed in claim 1, wherein the vehicular travel controlling section estimates the optical axis deviation quantity based on an amount of the impulse detected by the impulse detecting section and based on a map of impulse amount versus optical axis deviation quantity.

3. A vehicular traveling control apparatus as claimed in claim 1, further comprising an acceleration detecting section that detects a vehicular acceleration of the vehicle and wherein the impulse detecting section detects the impulse using the vehicular acceleration detected by the acceleration detecting section.

4. A vehicular traveling control apparatus as claimed in claim 1, further comprising a yaw rate detecting section that detects a yaw rate developed on the vehicle and wherein the impulse detecting section detects the impulse using the yaw rate detected by the yaw rate detecting section.

5. A vehicular traveling control apparatus as claimed in claim 1, further comprising a vehicle speed detecting section that detects a vehicular velocity of the vehicle and wherein the impulse detecting section detects the impulse using a variation rate of the vehicular velocity of the vehicle detected by the vehicle speed detecting section.

6. A vehicular traveling control apparatus as claimed in claim 1, wherein the impulse detecting section detects the impulse on the basis of the relative positional relationship between the forward substance detected by the vehicular forward substance detecting section and the vehicle.

7. A vehicular traveling control apparatus as claimed in claim 1, further comprising a collision avoidance determining section that determines whether it is possible to avoid a collision of the vehicle against the forward substance by a vehicular brake system and it is possible to avoid the collision of the vehicle against the forward substance by a driver's vehicular steering on the basis of the relative positional relationship to the forward substance detected by the vehicular forward substance detecting section, a braking characteristic of the vehicle, and a steering characteristic thereof and wherein the impulse detecting section detects the impulse when a result of a determination by the collision avoidance determining section indicates that it is not possible to avoid the collision of the vehicle against the forward substance through the vehicular brake system nor the driver's vehicular steering.

8. A vehicular traveling control apparatus as claimed in claim 1, wherein the running control varying section performs a vehicular traveling control only for a smaller relative positional relationship to the forward substance as the optical axis deviation quantity of the detection range estimated by the vehicular travel controlling section becomes large and also performs the vehicular travel control for a large relative positional relationship to the forward substance as the optical axis deviation quantity becomes small, as compared with the large optical axis deviation quantity.

9. A vehicular traveling control apparatus as claimed in claim 1, wherein the impulse detecting section comprises: an impulse occurrence determining section that determines whether such the impulse that the detection range of the vehicular forward substance detecting section is varied has occurred on the basis of whether a magnitude of an absolute value of an acceleration signal from a vehicular acceleration sensor is in excess of a predetermined display threshold value ($\Delta\theta_{SET}$); an optical axis deviation quantity estimating section that estimates the optical axis deviation quantity ($\Delta\theta$) of the vehicular forward substance detecting section with respect to the forward direction of the vehicle when the magnitude of a vehicular deceleration detected by the acceleration sensor is in excess of a predetermined display threshold value ($\Delta\theta_{SET}$); and an optical axis deviation display unit that displays a state of optical axis deviation when the optical axis deviation quantity ($\Delta\theta$) is equal to or smaller than the predetermined display threshold value ($\Delta\theta_{SET}$).

10. A vehicular traveling control apparatus as claimed in claim 9, wherein the impulse detecting section further comprises: a first optical axis deviation quantity determining section that determines whether the optical axis deviation quantity ($\Delta\theta$) is equal to or larger than a first predetermined value ($\Delta\theta_{TH2}$); a brake control operation distance setting section that sets a brake control operation distance ($d_{SET}$) in accordance with the optical axis deviation quantity ($\Delta\theta$) when the optical axis deviation quantity determining section determines that the optical axis deviation quantity ($\Delta\theta$) is equal to or smaller than the first predetermined value ($\Delta\theta_{TH2}$); and a second optical axis deviation quantity determining section that determines whether the optical axis deviation quantity ($\Delta\theta$) is larger than a second predetermined value ($\Delta\theta_{TH1}$) when the optical axis deviation quantity ($\Delta\theta$) is equal to or smaller than the first predetermined value ($\Delta\theta_{TH2}$).

11. A vehicular traveling control apparatus as claimed in claim 10, wherein, when the first optical axis deviation quantity determining section determines that the optical axis deviation quantity ($\Delta\theta$) is larger than the first predetermined value ($\Delta\theta_{TH2}$), a brake control inhibit flag $F_{CA}$ is set to a logical "1" representing brake control inhibit.

12. A vehicular traveling control apparatus as claimed in claim 11, further comprising a traveling control inhibiting section that inhibits the vehicular travel control by the vehicular travel controlling section when the impulse detecting section detects that the impulse has been applied to the vehicular forward substance detecting section, wherein the traveling control inhibiting section comprises a vehicular traveling control inhibit confirming section that confirms whether the brake control inhibit flag ($F_{CA}$) is set to a logical "1" and the brake of a vehicular brake system is not operated and the traveling control inhibiting section inhibits the travel control when the vehicular traveling control inhibit confirming section confirms that the brake control inhibit flag ($F_{CA}$) is set to a logical "1" and the brake system of the vehicle is not operated.

13. A vehicular traveling control apparatus as claimed in claim 12, further comprising a relative positional relationship determining section that determines whether the brake control inhibit flag ($F_{CA}$) is reset to a logical "0" and a relative distance (dr) between the vehicle and the forward substance detected by the vehicular forward substance detecting section is larger than a brake control operation distance ($d_{SET}$) when the vehicular traveling control inhibiting section confirms that the brake control inhibit flag ($F_{CA}$) is reset to the logical "1" and the brake system of the vehicle is operated.

14. A vehicular traveling control apparatus as claimed in claim 13, wherein an automatic braking is inhibited when the relative positional relationship determining section determines that the brake control inhibit flag ($F_{CA}$) is reset to a logical "0" and the relative distance (dr) between the vehicle and the forward substance is larger than the brake control operation distance ($d_{SET}$).

15. A vehicular traveling control apparatus as claimed in claim 14, further comprising a first collision avoidance enabling determining section that determines whether a collision avoidance against the forward substance by a braking through the brake system of the vehicle is possible on the basis of whether the relative distance (dr) and a relative velocity (Dr) between the vehicle and the forward substance give a predetermined relationship when the relative positional relationship determining section determines that the brake control inhibit flag ($F_{CA}$) is set to the logical "1" and the relative distance (dr) is equal to or smaller than the brake control operation distance ($d_{SET}$).

16. A vehicular traveling control apparatus as claimed in claim 15, further comprising a second collision avoidance enabling determining section that determines whether a collision avoidance against the forward substance by a vehicular driver's steering operation is possible on the basis of a vehicular lateral movement (Y) required for avoiding the collision against the forward substance and a time ($T_y$) required for the vehicle to avoid the collision by the vehicular driver's steering operation from the vehicular lateral movement when the relative positional relationship determining section determines that the brake control inhibit flag ($F_{CA}$) is reset to the logical "0" and the relative distance (dr) is equal to or smaller than the brake control operation distance ($d_{SET}$).

17. A vehicular traveling control apparatus as claimed in claim 16, wherein the lateral movement (Y) is determined on the basis of one of magnitudes of a rightward movement required to steer the vehicle in a rightward direction to avoid the collision against the forward substance and a leftward movement required to steer the vehicle in a leftward direction to avoid the collision against the forward substance which is smaller than the other and a time it takes to steer the vehicle to avoid the collision against the forward substance by the lateral movement (Y).

18. A vehicular traveling control apparatus, comprising:
vehicular forward substance detecting means for detecting a forward substance located in a forward direction of the vehicle;
vehicular travel controlling means for performing a vehicular travel control on the basis of a relative positional relationship between the forward substance detected by the vehicular forward substance detecting means and the vehicle;

impulse detecting means for detecting such an impulse that a detection range of the vehicular forward substance detecting means is varied has been applied to the vehicular forward substance detecting means;

the vehicular travel controlling means estimating an optical axis deviation quantity of the detection range of the vehicular forward substance detecting means when the impulse detecting means detects that the impulse has been applied to the forward substance detecting means; and running control varying means for varying a control method of the vehicular travel controlling means in accordance with the optical axis deviation quantity estimated by the vehicular travel controlling means.

19. A vehicular traveling control method performed by a computer, comprising:

providing a vehicular forward substance detecting section that detects a forward substance located in a forward direction of the vehicle;

performing a vehicular travel control on the basis of a relative positional relationship between the forward substance detected by the vehicular forward substance detecting section and the vehicle;

detecting such an impulse that a detection range of the vehicular forward substance detecting section is varied has been applied to the vehicular forward substance detecting section;

estimating an optical axis deviation quantity of the detection range of the vehicular forward substance detecting section when detecting that the impulse has been applied to the forward substance detecting section; and varying a control method of the vehicular travel control in accordance with the estimated optical axis deviation quantity.

20. A vehicular traveling control apparatus, comprising:

a vehicular forward substance detecting section configured to detect a relative positional relationship between a forward substance located in a forward direction of the vehicle and the vehicle;

a collision avoidance determining section configured to determine whether it is possible to avoid a collision of the vehicle against the forward substance on the basis of the relative positional relationship;

an automatic braking control section configured to perform an automatic braking control when the collision avoidance determining section determines that the collision cannot be avoided; and a braking control inhibiting section configured to inhibit the automatic braking control section based on a past determination that collision cannot be avoided as determined by the collision avoidance determining section and performance of the automatic braking control.

21. A vehicular traveling control apparatus, comprising:

vehicle forward substance detecting means for detecting a relative positional relationship between a forward substance located in a forward direction of the vehicle and the vehicle;

collision avoidance determining means for determining whether it is possible to avoid a collision of the vehicle against the forward substance on the basis of the relative positional relationship;

automatic braking control means for performing an automatic braking control when the collision avoidance determining means determines that the collision cannot be avoided; and braking control inhibiting means for inhibiting the automatic braking control based on a past determination that the collision cannot be avoided as determined by the collision avoidance determining means and performance of the automatic braking control.

22. A vehicular traveling control method, comprising:

detecting a relative positional relationship between a forward substance located in a forward direction of the vehicle and the vehicle;

determining whether it is possible to avoid a collision of the vehicle against the forward substance on the basis of the relative positional relationship;

performing an automatic braking control when determining that the collision cannot be avoided; and inhibiting the automatic braking control based on a past determination that collision cannot be avoided and performance of the automatic braking control.

23. A vehicular traveling control apparatus as claimed in claim 1, further comprising:

means for determining whether or not automatic braking is currently being performed, wherein the vehicular travel controlling section inhibits braking control when automatic braking is currently not being performed, and wherein when automatic braking is currently being performed, the vehicular travel controlling section determines whether or not braking avoidance or steering avoidance by a vehicle operator is possible to avoid a collision, and if so, the automatic braking is released.

24. A vehicular traveling control apparatus as claimed in claim 18, wherein the vehicular travel controlling means estimates the optical axis deviation quantity based on an amount of the impulse detected by the impulse detecting means and based on a map of impulse amount versus optical axis deviation quantity.

25. A vehicular traveling control method as claimed in claim 19, wherein the optical axis deviation quantity is estimated based on an amount of the impulse detected and based on a map of impulse amount versus optical axis deviation quantity.

* * * * *